United States Patent
Zhang et al.

(10) Patent No.: US 12,032,077 B2
(45) Date of Patent: Jul. 9, 2024

(54) SYSTEM AND METHOD FOR COMPENSATING FOR SCINTILLATION AND FOR FACILITATION OF LONG-BASELINE RTK

(71) Applicant: Deere & Company, Moline, IL (US)

(72) Inventors: Yufeng Zhang, Torrance, CA (US); Liwen Dai, Torrance, CA (US)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/663,363

(22) Filed: May 13, 2022

(65) Prior Publication Data

US 2023/0288576 A1    Sep. 14, 2023

Related U.S. Application Data

(60) Provisional application No. 63/269,196, filed on Mar. 11, 2022.

(51) Int. Cl.
| | | |
|---|---|---|
| G01S 19/44 | (2010.01) | |
| G01S 19/39 | (2010.01) | |
| G01S 19/41 | (2010.01) | |
| G01S 19/42 | (2010.01) | |
| H04W 4/40 | (2018.01) | |

(52) U.S. Cl.
CPC ............ *G01S 19/44* (2013.01); *G01S 19/396* (2019.08); *G01S 19/41* (2013.01); *G01S 19/423* (2013.01); *H04W 4/40* (2018.02)

(58) Field of Classification Search
CPC .............................. G01S 19/44; G01S 19/423
USPC ............ 342/357.21, 357.32, 357.46, 357.77, 342/357.27
See application file for complete search history.

(56) References Cited

U.S. PATENT DOCUMENTS

| | | | |
|---|---|---|---|
| 6,125,135 A | 9/2000 | Woo et al. | |
| 6,934,632 B2 | 8/2005 | Hatch | |
| 7,071,870 B2 | 7/2006 | Sharpe et al. | |
| 7,119,741 B2 | 10/2006 | Sharpe et al. | |
| 7,212,155 B2 | 5/2007 | Hatch et al. | |
| 7,231,295 B2 | 6/2007 | Pickett et al. | |
| 7,248,211 B2 | 7/2007 | Hatch et al. | |
| 7,427,950 B2 | 9/2008 | Eslinger et al. | |
| 7,511,661 B2 | 3/2009 | Hatch et al. | |
| 7,633,437 B2 * | 12/2009 | Hatch | G01S 19/44 |
| | | | 342/357.31 |
| 7,679,555 B2 | 3/2010 | Dai et al. | |

(Continued)

FOREIGN PATENT DOCUMENTS

WO    WO 2012128980 A1    9/2012

OTHER PUBLICATIONS

Christie et al., The Effects of the Ionosphere and C/A Frequency on GPS Signal Shape: Considerations for GNSS-2, Department of Aeronautics and Astronautics Stanford University, pp. 1-7.

(Continued)

*Primary Examiner* — Bo Fan

(57) ABSTRACT

The system and method facilitates Real-Time-Kinematic (RTK) GNSS with long baseline between a rover receiver and a base station receiver, even in the presence of scintillation or ionospheric disturbances that spatially fluctuate. Residual atmospheric errors can be estimated by a dual error model in a filter to promote efficient fixing or resolution of carrier phase ambiguities.

24 Claims, 10 Drawing Sheets

(56) References Cited

U.S. PATENT DOCUMENTS

| | | | |
|---|---|---|---|
| 7,911,378 B2 | 3/2011 | Zhang et al. | |
| 7,961,141 B2 | 6/2011 | Dai et al. | |
| 7,961,143 B2 | 6/2011 | Dai et al. | |
| 8,035,552 B2* | 10/2011 | Dai | G01S 19/32 342/357.23 |
| 8,242,953 B2 | 8/2012 | Dai et al. | |
| 8,427,365 B2 | 4/2013 | Dai et al. | |
| 8,665,145 B2 | 3/2014 | Dai et al. | |
| 8,766,848 B2* | 7/2014 | Dai | G01S 19/44 342/357.27 |
| 8,803,736 B2 | 8/2014 | Dai et al. | |
| 9,599,721 B2* | 3/2017 | Dai | G01S 19/33 |
| 10,191,157 B2 | 1/2019 | Dai et al. | |
| 10,222,483 B2 | 3/2019 | Dai et al. | |
| 10,222,484 B2 | 3/2019 | Dai et al. | |
| 10,338,232 B2 | 7/2019 | Zhang et al. | |
| 10,379,225 B2 | 8/2019 | Dai et al. | |
| 10,386,496 B2 | 8/2019 | Dai et al. | |
| 10,393,882 B2 | 8/2019 | Dai et al. | |
| 10,422,885 B2 | 9/2019 | Dai et al. | |
| 10,564,293 B2 | 2/2020 | Zhang et al. | |
| 10,564,294 B2 | 2/2020 | Dai et al. | |
| 10,605,926 B2* | 3/2020 | Lie | G01S 19/426 |
| 10,802,160 B2 | 10/2020 | Dai et al. | |
| 10,969,496 B2 | 4/2021 | Martin et al. | |
| 11,150,352 B2 | 10/2021 | Kuntz et al. | |
| 11,175,414 B2 | 11/2021 | Zeitzew et al. | |
| 2019/0302274 A1 | 10/2019 | Berntorp et al. | |
| 2023/0288577 A1 | 9/2023 | Zhang et al. | |

OTHER PUBLICATIONS

Datta-Barua et al., Bounding Higher Order Ionosphere Errors for the Dual Frequency GPS User, pp. 1-16.

Guo et al., Ionospheric scintillation intensity fading characteristics and GPS receiver tracking performance at low latitudes, Feb. 27, 2019, pp. 1-12, [online]. Retrieved from the Internet <URL: https://doi.org/10.1007/s10291-019-0835-1>.

Chen et al., Assessment and Validation of Three Ionospheric Models (IRI-2016, NeQuick2, and IGS-GIM) From 2002 to 2018, Apr. 30, 2020, pp. 1-14, [online]. Retrieved from the Internet <URL: e2019SW002422. https://doi.org/10.1029/2019SW002422>.

The International Search Report and the Written Opinion of the International Searching Authority issued in counterpart application No. PCT/US2022/081145, dated Mar. 30, 2023 (10 pages).

* cited by examiner

SYSTEM AND METHOD FOR COMPENSATING FOR SCINTILLATION AND FOR FACILITATION OF LONG-BASELINE RTK

RELATED APPLICATION

This document (including the drawings) claims priority and the benefit of the filing date based on U.S. provisional application No. 63/269,196, filed Mar. 11, 2022, under 35 U.S.C. § 119 (e), where the provisional application is hereby incorporated by reference herein.

FIELD

This disclosure relates to a system and method for compensating for scintillation and for facilitating of long-baseline RTK.

BACKGROUND

Scintillation refers to propagation of electromagnetic signals that are subject to frequency-dependent fluctuations in amplitude and phase associated with the signals passing through atmospheric (e.g., ionospheric) differences that cause changes or irregularities in the transmission path of the signal with respect to time. For example, in the Southern hemisphere, the worst-case scintillation may occur on a seasonal basis during summer and evenings.

Real-time-kinematic (RTK) base stations can support precise, repeatable estimation of absolute positions, such as equipment, row, crop or plant positions that do not fluctuate from pass-to-pass during the growing season. Further, RTK can supplement or replace PPP position estimates to the extent that precise point positioning (PPP) or other solutions are susceptible from variation. Long-baseline RTK configurations may be vulnerable to ionospheric variations, where long-baseline RTK may be generally applicable to a baseline distance between a rover GNSS receiver and a base-station receiver of fifty (50) kilometers or greater.

A potential vulnerability for long-baseline RTK is that local variation in ionosphere density may result in satellite signal diffraction that are prone to propagation-related phase shifts and propagation-related amplitude fades. Phase shifts can result in position bias; certain amplitude fade can mean loss of signal to noise ratio (e.g., signal quality) or track of Global Navigation Satellite Systems (GNSS) signals. Thus, there is a need for a system and method for compensating for scintillation and for facilitating of long-baseline RTK.

SUMMARY

In accordance with one embodiment, a method is disclosed for a estimating position by a rover receiver in wireless communication with a base station receiver at a known location. The rover receiver and the base station receiver are capable of receiving a plurality of Global Navigation Satellite System (GNSS) signals from GNSS satellites. The receivers are configured to obtain initial code pseudo-range measurements and initial carrier phase measurements from the signals transmitted by GNSS satellites and satellite orbit and clock corrections from an augmentation system. The base station receiver is configured to generate measurement range errors and atmospheric related aiding data based on the known location of the base station receiver, with the aid of satellite orbit and clock corrections from the augmentation system. The range errors and aiding information are wirelessly sent or transmitted to the rover receiver. The rover receiver uses the range errors and the aiding information from base station receiver to correct the initial code pseudo-range measurements and the initial carrier phase measurements to mitigate errors in the signal, to result in corrected code pseudo-range measurements and corrected carrier phase measurements. The rover receiver estimates residual error of atmosphere delay with dual error model that is configured to apply a preset error model before ambiguities are fixed or resolved, and to apply adaptive error model after ambiguities are fixed or resolved. The rover receiver conducts (e.g., efficiently) ambiguity resolution to fix or to resolve carrier phase ambiguities for qualified or eligible ambiguities.

BRIEF DESCRIPTION OF THE DRAWINGS

Like elements are assigned like reference numbers in any set of two or more drawings.

DETAILED DESCRIPTION OF PREFERRED EMBODIMENTS

Figure 1A:
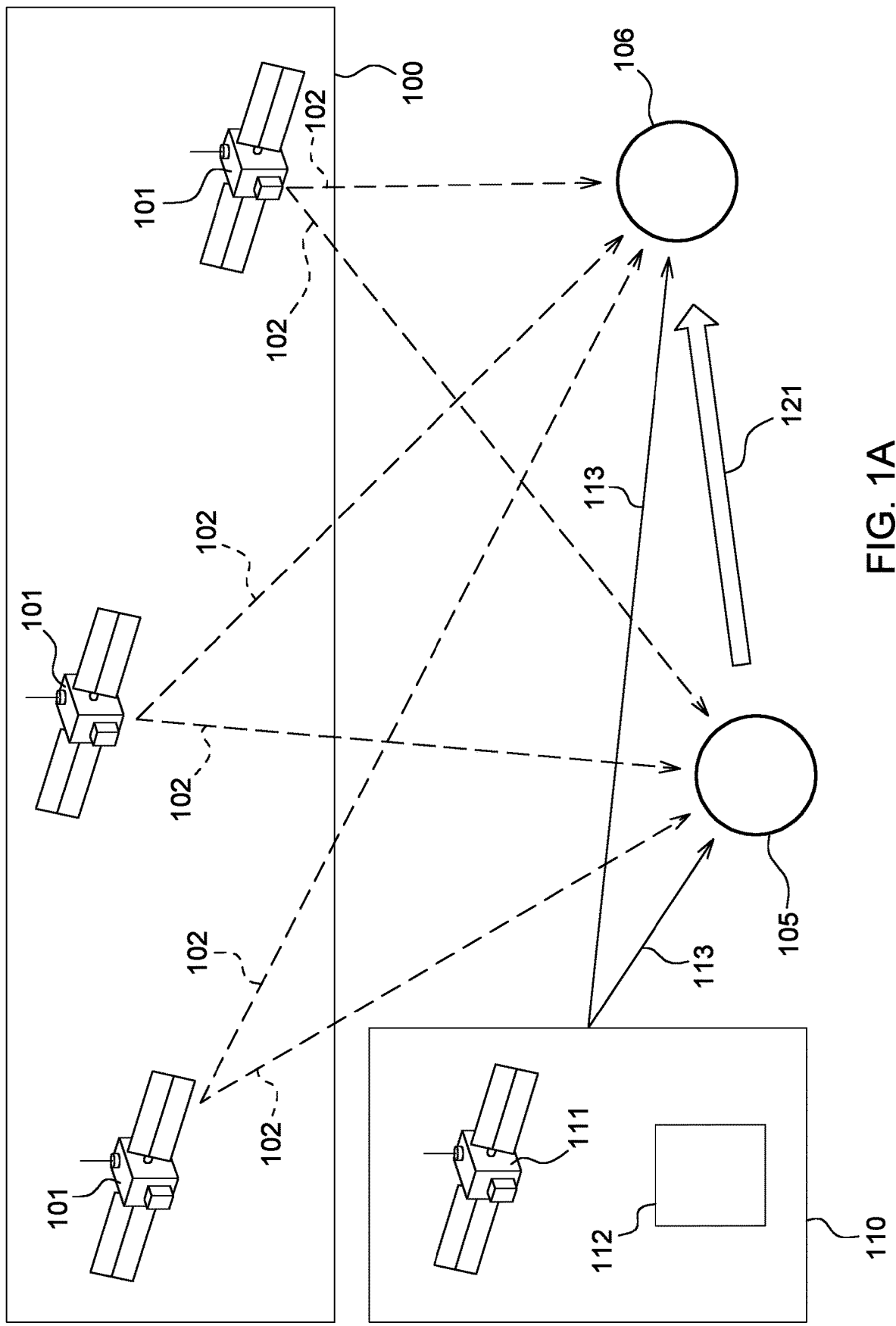
FIG. 1A is an illustrative block diagram of a first embodiment of a Real-Time-Kinematic (RTK) system with the aid of an augmentation system.

In any of the above referenced drawings of this document, any arrow or line that connects any blocks, components, modules, multiplexers, memory, data storage, accumulators, data processors, electronic components, oscillators, signal generators, or other electronic or software modules may comprise one or more of the following items: a physical path of electrical signals, a physical path of an electromagnetic signal, a logical path for data, one or more data buses, a circuit board trace, a transmission line; a link, call, communication, or data message between software modules, programs, data, or components; or transmission or reception of data messages, software instructions, modules, subroutines or components.

In one embodiment, the system, method and receiver disclosed in this document may comprise a computer-implemented system, method or receiver in which one or more data processors process, store, retrieve, and otherwise manipulate data via data buses and one or more data storage devices (e.g., accumulators or memory) as described in this document and the accompanying drawings. As used in this document, "configured to, adapted to, or arranged to" mean that the data processor or receiver is programmed with suitable software instructions, software modules, executable code, data libraries, and/or requisite data to execute any referenced functions, mathematical operations, logical operations, calculations, determinations, processes, methods, algorithms, subroutines, or programs that are associated with one or more blocks set forth in any other drawing in this disclosure. Alternately, separately from or cumulatively with the above definition, "configured to, adapted to, or arranged to" can mean that the receiver comprises one or more components described herein as software modules, equivalent electronic hardware modules, or both to execute any referenced functions, mathematical operations, calculations, determinations, processes, methods, algorithms, subroutine.

The global navigation satellite systems (GNSS) including GPS, GLONASS, BEIDOU, GALILEO, QZSS, IRNSS and SBAS, use satellites orbiting the Earth to locate the position (e.g., three dimensional coordinates) of GNSS receivers, or their antennas, on or above Earth. Typically, both pseudo-range and integrated carrier phase GNSS measurements are available within a civilian GNSS receiver for each carrier signal of each GNSS satellite that is being tracked. The pseudo-range measurement records the apparent time duration taken for the relevant code to travel from the satellite to the receiver. The time duration equals the time the signal arrives at the receiver according to the receiver clock minus the time the signal left the satellite according to the satellite clock.

In a GNSS receiver, the carrier phase measurement can be obtained by integrating a reconstructed carrier of the signal as it arrives at the receiver, or in accordance with other measurement techniques. The carrier phase measurement is a measure of a transit time difference as determined by the time the signal left the satellite according to the satellite clock and the time it arrives at the receiver according to the receiver clock. However, because the initial number of whole cycles in transit between the satellite and the receiver, when the receiver starts tracking the carrier phase of the signal, is not known, the transit time difference obtained from the carrier phase will typically be in error by a multiple (e.g., plus or minus one integer or its equivalent wavelength) carrier cycles. Accordingly, there is a whole-cycle ambiguity in the carrier phase measurement for the carrier phase between the receiver and each satellite, until it is resolved through various procedures.

The range or distance between a GNSS receiver and each of a multitude of observable satellites is calculated by multiplying each signal's travel time from the satellite to the GNSS receiver by the speed of light. These ranges are usually referred to as pseudo-ranges because the receiver clock generally has a significant time error which causes a common bias in the measured range with respect to each satellite in a set of satellite signals received by the receiver. By using differenced measurements, the common bias from receiver clock error is solved for along with the position coordinates of the receiver as part of the normal navigation computation. Various other factors can also lead to errors or noise in the calculated range, including ephemeris error, satellite clock timing error, atmospheric effects, receiver noise and multipath error. In standalone GNSS navigation, where the receiver obtains code and/or carrier-phase ranges from multiple satellites without the benefit of corrections from any reference stations, the receiver is very limited in methods available to reduce the errors or noises in the ranges.

To eliminate or reduce systematic errors, differential operations are typically used in GNSS applications. Differential GNSS operations typically involve one or more reference receivers located at known sites (sometimes called base stations) together with a communication link between the user's mobile receiver and the reference receiver. The reference receivers generate correction data associated with some or all of the above errors and the correction data is sent to the user receiver over the communication link. The mobile receiver then applies the correction data to its own carrier phase measurements or position estimate and thereby obtains a more accurate computed position. The correction data from a respective reference receiver can be in the form of corrections to the reference receiver position determined at the reference site or in the form of corrections to the specific GNSS satellite clock and/or orbit data. Differential operations using carrier-phase measurements are often referred to as real-time kinematic (RTK) positioning/navigation operations.

The fundamental concept of Differential GNSS (DGNSS) is to take advantage of the spatial and temporal correlations of the errors inherent in the GNSS measurements. For short baseline or separation between the mobile receiver and the reference receiver, the mobile receiver can use the correction data to cancel or significantly mitigate most of the noise sources in the pseudo-range and/or carrier phase measurements. The amount of mitigation depends upon the correlation between the error sources at the mobile receiver and reference receiver. While the GNSS satellite clock timing error, which appears as a bias on the pseudo-range or carrier phase measurement, is perfectly correlated between the reference receiver and the mobile receiver, most of the other error factors are either not correlated or the correlation diminishes as a function of distance between the mobile receiver and the reference receiver.

A number of different techniques have been developed to obtain high-accuracy differential navigation using the GPS carrier-phase measurements. The technique with the highest accuracy is the real-time kinematic (RTK) technique, which yields a typical accuracy of about one-centimeter. However, to obtain that accuracy, the mobile receiver needs to determine the whole-cycle ambiguity in the differential carrier-phase measurements. When the distance between the user's mobile receiver and the reference receiver (baseline distance) is short, the RTK technique is highly advantageous because in this case, the whole-cycle ambiguity can be resolved not only accurately but also quickly. On the other hand, when the baseline distance is more than a few tens of kilometers, it may become impossible to determine the whole-cycle ambiguity and the normal RTK accuracy cannot be achieved. Another limitation of the RTK technique is that it requires a local radio link to be maintained between the reference receiver and the navigation receiver to supply timely correction or measurement data.

To overcome the error sources within the DGNSS system in wide-area applications, various regional, wide-area, or global DGPS (sometimes referred to as Precise Point Positioning PPP) techniques have been developed. The typical PPP includes a network of multiple reference stations in communication with a computational center or hub. The computational center determines precise correction data based upon the known locations of the reference stations and the carrier phase measurements taken by them. The computed correction data are then transmitted to users via a communication link such as satellite, phone, or radio. By using multiple reference stations, PPP provides more accurate estimates of the precise correction data.

Precise positioning refers to precise point positioning (PPP) or similar forms of providing accurate position estimates based on differential correction data or correction data such as precise clock and orbit corrections. Precise point positioning (PPP) means: (1) use precise satellite orbit and clock corrections, rather than normal satellite broadcast information (ephemeris data), to determine a relative position or absolute position of a mobile user satellite navigation receiver without any local reference satellite stations to provide differential correction, or (2) use precise satellite orbit and clock corrections, ordinary broadcast information (ephemeris data) and with differential correction data, measured range data, or carrier phase data from one or more local reference stations. Although the resulting positions can be accurate within a few centimeters using state-of-the-art algorithms, conventional precise point positioning can take a long convergence time of up to tens of minutes to determine the ambiguity integer or floating ambiguity value to achieve the advertised steady-state accuracy is typically a limiting factor in their applicability. Here, the method and receiver of this disclosure does not aim to improve the convergence time of the PPP or determination of an absolute position based PPP. However, when working in conjunction with a PPP system, the receiver or method of this disclosure provides the opportunity to achieve the steady-state level precision for relative position prior to complete convergence or determination of a ambiguity integer or floating ambiguity value.

The PPP techniques that employ a carrier-phase differential method can achieve very high navigational accuracy. The PPP differential techniques are typically characterized by reliable long distance communication links or by reliable satellite communication links. Precise correction data can generally be communicated to navigation receivers without significant interruption. However, certain PPP techniques treat the whole-cycle ambiguities as a real-valued (non-integer) variable and solve for a "floating ambiguity," which is usually very poorly defined until measurement data covering a time interval of significant satellite geometry change have been obtained. Thus, in a PPP application, a time interval as long as approximately thirty to approximately sixty minutes may be required to solve for the "floating ambiguity" with sufficient accuracy to yield a navigated position with a reliable accuracy of less than (i.e., better than) a few centimeters.

A Global Navigation Satellite System (GNSS) is based on simultaneously ranging from at least four satellites, with known satellite coordinates (e.g., versus GNSS system/constellation time). The GNSS receiver can estimate a three-dimensional coordinates and receiver clock bias based on simultaneously ranging from at least four satellites, with known satellite coordinates. GNSS constellations include Global Positioning System (GPS) controlled by the U.S., GLONASS controlled by Russia, GALILEO controlled by the Europe Union, and BEIDOU controlled by China, among others. The accuracy of GNSS positioning can depend on accuracy of the ranging measured between a satellite and a receiver, the motion and coordinate accuracy of the satellites, and the geometry of the measurements. For example, the ranging measurement accuracy can be determined by the satellite clock stability, troposphere density, ionosphere activity level, and local interference and multi-path environment. To provide reliable and accurate GNSS positioning solutions, GNSS technology can use Precise Point Positioning (PPP) technology, Real Time Kinematic (RTK) technology, or both.

PPP technology comprises a global or regional GNSS reference station network and a data processing center for determining correction data that is wirelessly provided to a rover or mobile GNSS receiver. The rover or mobile GNSS receiver uses a rover positioning algorithm to estimate a rover position. Within the GNSS reference station network, the GNSS reference stations at fixed, known positions (e.g., known three-dimensional coordinates) track the GNSS satellites and provide ranging measurements between one or more satellites and each GNSS reference station. With these ranging measurements, the data processing center determines correction data based on satellite health conditions. For example, the PPP correction data comprises accurate satellite coordinate and clock parameters.

At the rover GNSS receiver, the rover positioning algorithm can achieve precise positioning as accurate as 5 centimeters, or even better accuracy with a corresponding reliability level, based on these accurate satellite orbit and clock parameters of the correction data and an Ionosphere Free measurement combination, which are derived from carrier phase measurements and code phase measurements of the rover GNSS receiver. The main limitation or drawback of PPP technology tends to be the convergence time, which can generally take more than half an hour to converge on a resolution of integer ambiguities for carrier phase for a set of satellites within view or reception range of the GNSS receiver. To speed up the initialization and further improve the positioning accuracy, PPP Ambiguity Resolution (PPP-AR) technology has been invented. Beside satellite orbit and clock parameters (e.g., in the correction data), PPP-AR provides other aiding-parameters to help rover algorithm resolve integer carrier phase ambiguities. With PPP-AR technology, the initialization time can be improved (e.g., less than 20 minutes) and the accuracy can be approaching several centimeters (e.g., 2.54 centimeter or inch level).

RTK means real-time kinetic system that uses carrier phase measurements of base stations at known locations (e.g., fixed, known coordinates) and navigation data (e.g., on civilian available L1 or L2 signals, like L1C/A, L1C, or L2C for GPS) to determine a correction data or differential signal that is broadcast or transmitted via a wireless link to rover receivers that can use the correction data. RTK can be used separately or collectively with PPP.

The distance or baseline between each base station and rover receiver may have a maximum baseline in which the correction data is reliable because of potential ionosphere variation that sometimes can affect the base station differently than the rover receiver and because of potential scintillation that again sometimes affect the base station differently than the rover receiver. RTK technology is based on the property that orbit and clock errors from any given satellite are the same or similar for nearby receivers and the transmission ranging errors are highly correlated for nearby receivers.

An RTK pair consists of a GNSS base station receiver and a GNSS rover receiver. The base station receiver is mounted at a pre-surveyed location (e.g., fixed, known location) and the rover receiver stays at the vicinity of the base receiver, such as equal to or less than a baseline or distance of 20 kilometers between the base station receiver and a rover receiver. The ranging errors from base station receiver can be calculated with its known coordinate and sent to rover receiver. The rover receiver receives and applies the error corrections from base receiver to improve positioning accuracy.

RTK technology is well suited for fast initialization and high accuracy if the rover receiver is sufficiently close or nearby to the base station, such as less than 50 kilometer baseline or distance between the base station receiver and the rover receiver. However, the error correlation between base station receiver and rover receiver becomes weaker when the distance between base station receiver and rover receivers becomes longer; hence, generally the RTK positioning accuracy will become unreliable when the baseline is longer than about 50 kilometers. Long-baseline RTK configurations may be vulnerable to ionospheric variations, where long-baseline RTK may be generally applicable to a baseline distance between a rover GNSS receiver and a base-station receiver of fifty (50) kilometers or greater.

Further, long-baseline RTK tends to be susceptible to ionosphere scintillation. The ionosphere delay between base station receiver and rover receiver becomes less correlated during scintillation, which results in a poor RTK performance. Network RTK technology has been innovated to expand the RTK working range. However, the network RTK technology needs more base station receivers, where the rover receivers can only work well within the network.

FIG. 1A illustrates a representative GNSS system 100, which comprises multiple GNSS satellites 101. Each GNSS satellite 101 transmits satellite signal 102 (e.g., L1 signal and/or L2 signal for GPS) to GNSS base station receiver 105 (e.g., base receiver) and GNSS rover receiver 106. The signal 102 may include navigation data, such as ephemeris data, satellite almanac data, position data, orbit data and clock data of a corresponding GNSS satellite 101 that transmits satellite signal 102.

The GNSS satellite 101 may broadcast signal 102 on multi-frequencies. For example, if GNSS satellite 101 is from GPS system, it can broadcast signal 102 on more than one frequency, that includes L1, L2 and L5 frequencies used in GPS system. In one embodiment, GNSS system 100 can be from any of GPS, GLONASS, GALILEO, BEIDOU and other GNSS systems/constellations. In another embodiment, GNSS system 100 may include more than one GNSS constellation.

Augmentation system 110 broadcasts signal 113 to GNSS base receiver 105 and GNSS rover receiver 106. Signal 113 may include but not limited to any of the following: orbit correction data and clock correction data for respective GNSS satellite 101, phase bias information for respective GNSS satellite 101, and atmospheric (e.g., delay/advance) data for signal 102. In one embodiment, augmentation system 110 can broadcast aiding information 113 from augmentation satellite 111. In another embodiment, augmentation system 110 can broadcast aiding information 113 from computer server 112 through internet. In one embodiment, the augmentation system 110 can be a public augmentation system like Satellite Based Augmentation System including Wide Area Augmentation System (WAAS) from US, European Geostationary Navigation Overlay Service (EGNOS) from Europe, MTSAT Satellite Based Augmentation Navigation System (MSAS) from Japan, GPS-Aided GEO Augmented Navigation System (GAGAN) from India, System for Differential Corrections and Monitoring (SDCM) from Russia and other emerging SBAS systems. In another embodiment, augmentation system 110 can be a private augmentation system.

GNSS base receiver 105 is mounted at a pre-surveyed location. It tracks signals from GNSS system 100 and augmentation system 110, generates RTK corrections 121 for GNSS satellites 101 based on the pre-surveyed coordinate and augmentation corrections 113. The generated RTK corrections 121 are sent to GNSS rover receivers 106 through RTK correction data streams. In one embodiment, RTK corrections 121 only include range errors for each measurement from GNSS satellite 101. In another embodiment, RTK corrections 121 include range errors for each measurement from GNSS satellite 101 and atmosphere delay calculated in base receiver 105. In another embodiment, RTK corrections 121 include range error, atmosphere delay and ambiguity information calculated in base receiver 105. In another embodiment, raw measurements will be sent to rover instead of range errors in RTK corrections 121. In one embodiment, RTK corrections are calculated without the augmentation information 113. In another embodiment, RTK corrections are calculated with the augmentation information 113.

In one embodiment, atmospheric delay is in the form of a zenith delay with mapping function for each measurement. Zenith delay is the atmospheric delay experienced by a satellite signal that propagates in the zenith direction, which is a point vertically above a rover receiver or base station receiver; zenith delay may be characterized by a hydrostatic zenith delay component and a non-hydrostatic zenith component. In alternate embodiments, the elevation angle and the azimuth angle between the satellite and receiver are used to estimate atmospheric delay in the dual model. The elevation angle means the angle between a receiver-to-satellite geometric path and a horizontal line (e.g., or curved line along the Earth's surface). The azimuth is the direction of a satellite in the horizontal plane of the Earth with respect to a rover or base station receiver, which sometimes may be measured in degrees from North in a clockwise direction.

In another embodiment, atmospheric delay is in the form of a slant atmospheric delay for each measurement, where the slant atmospheric delay represents the total propagation delay in a GNSS signal between the satellite and a receiver antenna of the rover receiver of base station receiver. The slant atmospheric delay may have a hydrostatic slant delay component (e.g., arising from dry atmospheric constituents) and an non-hydrostatic slant delay component (e.g., arising from wet constituents or water vapor). The slant atmospheric delay may be used in conjunction with a mapping function to estimate zenith atmospheric or tropospheric delay. Further, the slant atmospheric delay can define an ionospheric delay component that impacts phase code measurements and carrier phase measurements and that is generally proportional to the slant total electron count (TEC) divided by the measurement frequency squared (e.g., carrier frequency of the satellite signal for carrier phase measurements of at least for the first order ionospheric delay components and possibly for the carrier frequency plus and minus the encoded signal peak frequency of phase code). In some embodiments, the slant total electronic count is estimated based on the vertical total electron count that is available for a propagation path of interest in conjunction with an appropriate mapping function. In one embodiment, RTK corrections are sent with public data format like radio technical commission for maritime services (RTCM). In another embodiment, RTK corrections are sent with an appropriated data format.

GNSS rover receiver 106 tracks signals 102 from GNSS system 100 and aiding information 113 from augmentation system 110, and receives RTK corrections 121 from base receiver 105. In one embodiment, GNSS rover receiver 106 applies a dual (e.g., two stage) RTK algorithm with all the information it received to achieve high position accuracy without a baseline length limit (e.g., such as long-baseline RTK exceeding 50 kilometers) and without atmospheric activity limit (e.g., Total Electron Count of ionosphere exceeding a certain threshold).

For example, the GNSS rover receiver 106 may be configured use the follow RTK techniques, separately or cumulatively. Under a first technique, the augmentation information 113 is applied within an RTK algorithm, such as a dual (e.g., two stage) RTK algorithm. Under a second technique, RTK corrections 121 are generated in base receiver 105 and transmitted wirelessly, by a wireless link, to the GNSS rover receiver from the RTK base station.

Under a third technique, the RTK corrections 121 are generated in a rover receiver 106 with the (raw) GNSS measurements and coordinates for base station receiver 105, where the (raw) GNSS measurements and coordinates for the base station receiver 105 are transmitted wirelessly, by a wireless link, to the GNSS rover receiver 106 from the RTK base station.

Under a fourth technique, GNSS rover receiver 106 does not use the augmentation information 113 in its RTK algorithm.

Figure 1B:
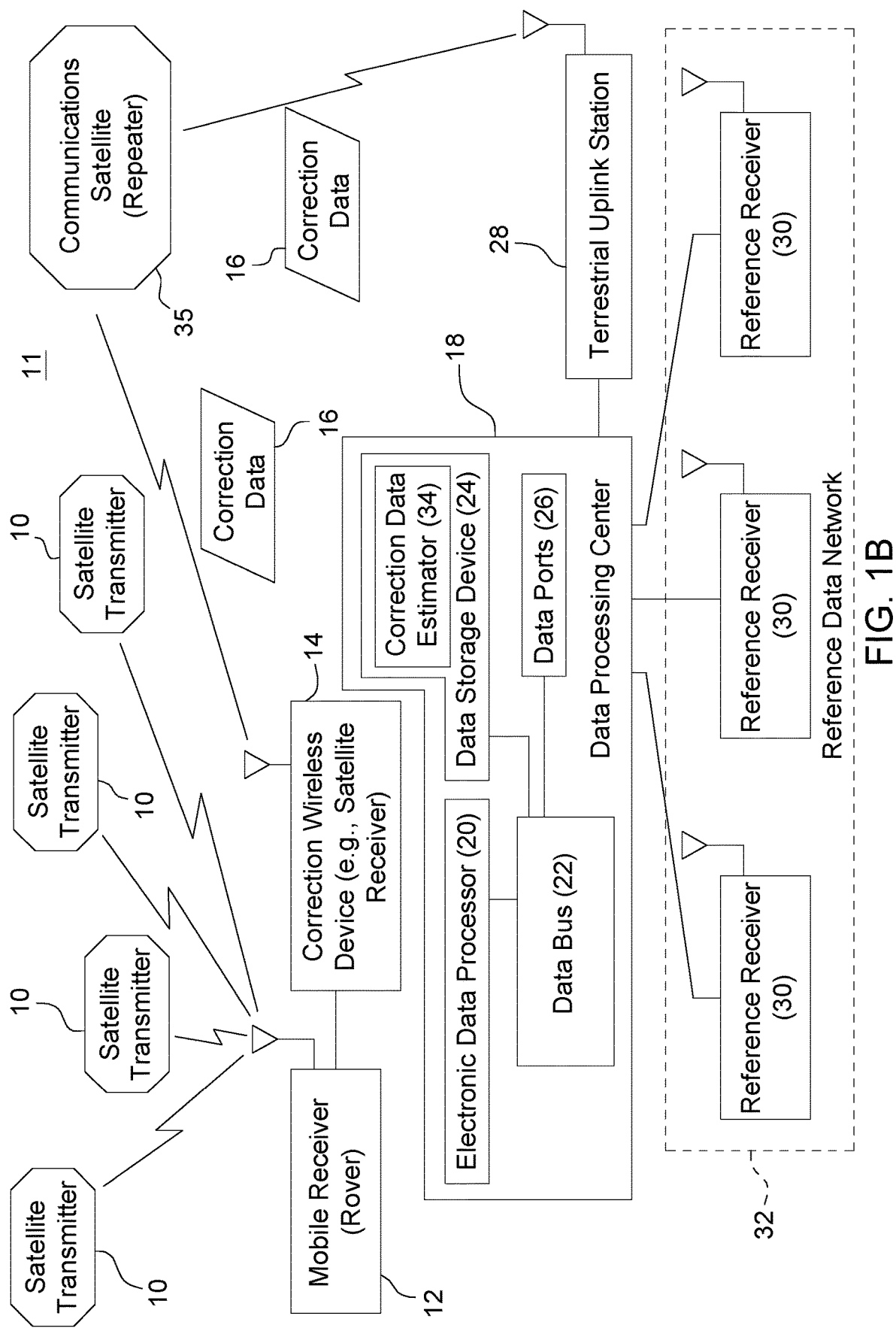
FIG. 1B is an illustrative block diagram of one embodiment of a GNSS system with the aid of a correction or augmentation system.

In FIG. 1B, a mobile receiver 12 and a reference receiver 30 each comprise a location-determining receiver or satellite receiver, such as a Global Navigation Satellite System (GNSS) receiver. The mobile receiver 12 and each reference receiver 30 are capable of making carrier phase measurements that are subject to ambiguities, such as integer ambiguities, in the cycles of each received satellite signal. The receiver (12, 30) determines or resolves ambiguities of carrier phase measurements of the respective received satellite signals to estimate accurately the precise position or coordinates of the receiver. Although the code phase or pseudo-range measurements of the receiver (12, 30) are not associated with integer ambiguities in the cycles of the received satellite, code phase measurements do not provide the centimeter level position accuracy required for certain applications (e.g., vehicle navigation).

As used throughout this document, ambiguities are often specific to the context of particular equations which relate to observations from one or more receivers of carrier phase signals from one or more satellites. Accordingly, it is possible to have wide-lane (WL) ambiguities, narrow-lane (NL) ambiguities, zero-difference (ZD) ambiguities, single-difference (SD) ambiguities, double-difference (DD) ambiguities, real-time-kinematic (RTK) ambiguities, and refraction-corrected (RC) ambiguities that relate to phase measurements from one or more receivers, or one or more satellites. In this document, any reference to ambiguity can refer to a singular ambiguity or plural ambiguities.

If the satellite navigation receiver (12, 30) can receive at least two frequencies, such as L1 and L2 frequencies, the difference of the L1 and L2 carrier phase measurements can be combined to form wide-lane (WL) measurement (e.g., with a wavelength of approximately 86.25 centimeters for Global Positioning System, GPS) and the sum of the L1 and L2 carrier phase measurements can be combined to form narrow-lane (NL) measurements (e.g., with a wavelength of approximately 10.7 centimeters). The wide-lane measurements facilitate quick and efficient resolution of wide-lane integer ambiguities, whereas the narrow-lane measurements facilitate precise and accurate resolution of narrow-lane ambiguities with minimal phase noise. The refraction-ambiguities compensate for atmospheric delay bias, such as ionospheric delay bias.

Single difference measurements (e.g., of carrier phase or code phase) are generally formed with respect to one satellite, a reference receiver 30 and a mobile receiver 12 (e.g., rover). In contrast, double difference measurements are generally formed with respect to two satellites, a reference receiver 30 and a mobile receiver 12, or by subtracting two single-difference measurements. However, certain double-difference measurements can be formed with two single-difference measurements from the same receiver at two different times and associated with a pair of satellites.

In FIG. 1B, the system comprises a constellation of satellites or satellite transmitters 10, including at least those satellites that are within view or reception range of one or more reference receivers 30 (e.g., reference GNSS receivers). In practice, reference receivers 30 (e.g., GNSS reference stations) are globally distributed at sites with good satellite geometry and visibility to a set of satellites or satellite transmitters 10. Each reference receiver 30 has a measurement module that measures observables, such as the carrier phase of one or more received satellite signals from each satellite. The reference receiver 30 may also measure the pseudo-range or code phase of a pseudo-random noise code that is encoded on one or more of the carrier signals. The reference receivers 30 receive and send measurements, ephemeris data, other observables and any information derived from the deliverables to an electronic data processing center 18 (e.g., hub). In one embodiment, each reference receiver 30 transmits (e.g., via a communications link, a communications network, a wireless channel, a communications channel, communications line, a transmission line, or otherwise) a set of carrier phase measurements of received satellite signals, and associated satellite identifiers, and ephemeris data to an electronic data processing center 18 (e.g., reference data processing hub).

The data processing center 18 or its correction data estimator 34 determines correction data in real time based on the measurements, ephemeris data, other observables and any derived information received from one or more reference receivers 30. In one embodiment, the data processing center 18 comprises an electronic data processor 20, a data storage device 24, and one or more data ports 26 that are coupled to a data bus 22. The data processor 20, the data storage device 24 and the one or more data ports 26 may communicate with each other via the data bus 22.

Software instructions and data that are stored in the data storage device 24 may be executed by the data processor 20 to implement any of the blocks, components or modules (e.g., electronic modules, software modules, or both) described in this disclosure document. The data processor 20 may comprise a microcontroller, a microprocessor, a programmable logic array, an application specific integrated circuit (ASIC), a digital signal processor, or another device for processing data, manipulating, accessing, retrieving, and storing data. A data storage device 24 may comprise electronic member, non-volatile electronic memory, an optical storage device, a magnetic storage device, or another device for storing digital or analog data on a tangible storage medium, such as an optical disk, a magnetic disk, or electronic memory. Each data port 26 may comprise a buffer memory, a transceiver or both for interfacing with other network elements, such as a reference receiver 30 or a terrestrial satellite uplink station 28.

In one embodiment, the data processing center 18 or data processor 20 or correction data estimator 34 receives the phase measurements and corresponding satellite identifiers from the reference receivers 30, reference receiver identifiers (or corresponding coordinates) and processes the phase measurements to estimate a clock bias for each satellite, or rather each satellite signal, or a corresponding clock solution for incorporation into correction data 16. As illustrated in FIG. 1B, the clock solution, clock bias or correction data 16 is provided to a terrestrial uplink station 28 or another communications link. For example, the terrestrial uplink station 28 communicates or transmits the clock solution, clock biases or correction data 16 to a communications satellite 35 (e.g., repeater).

In turn, the communications satellite 35 transmits the correction data 16 to a correction wireless device 14 (e.g., a satellite receiver or L-band satellite receiver). The correction wireless device 14 is coupled to a mobile receiver 12 (e.g., mobile GNSS receiver) or rover. The mobile receiver 12 also receives satellite signals from one or more GNSS satellites and measures the carrier phase (and code phase) of the received satellite signals. In conjunction with the phase measurements, the precise clock solutions or clock biases in the correction data 16 can be used to estimate the precise position, attitude, or velocity (e.g., solution) of the mobile receiver 12. For example, the mobile receiver 12 may employ a precise point positioning (PPP) estimate using precise clock and orbital solutions for the received signals of the satellites.

Figure 1C:
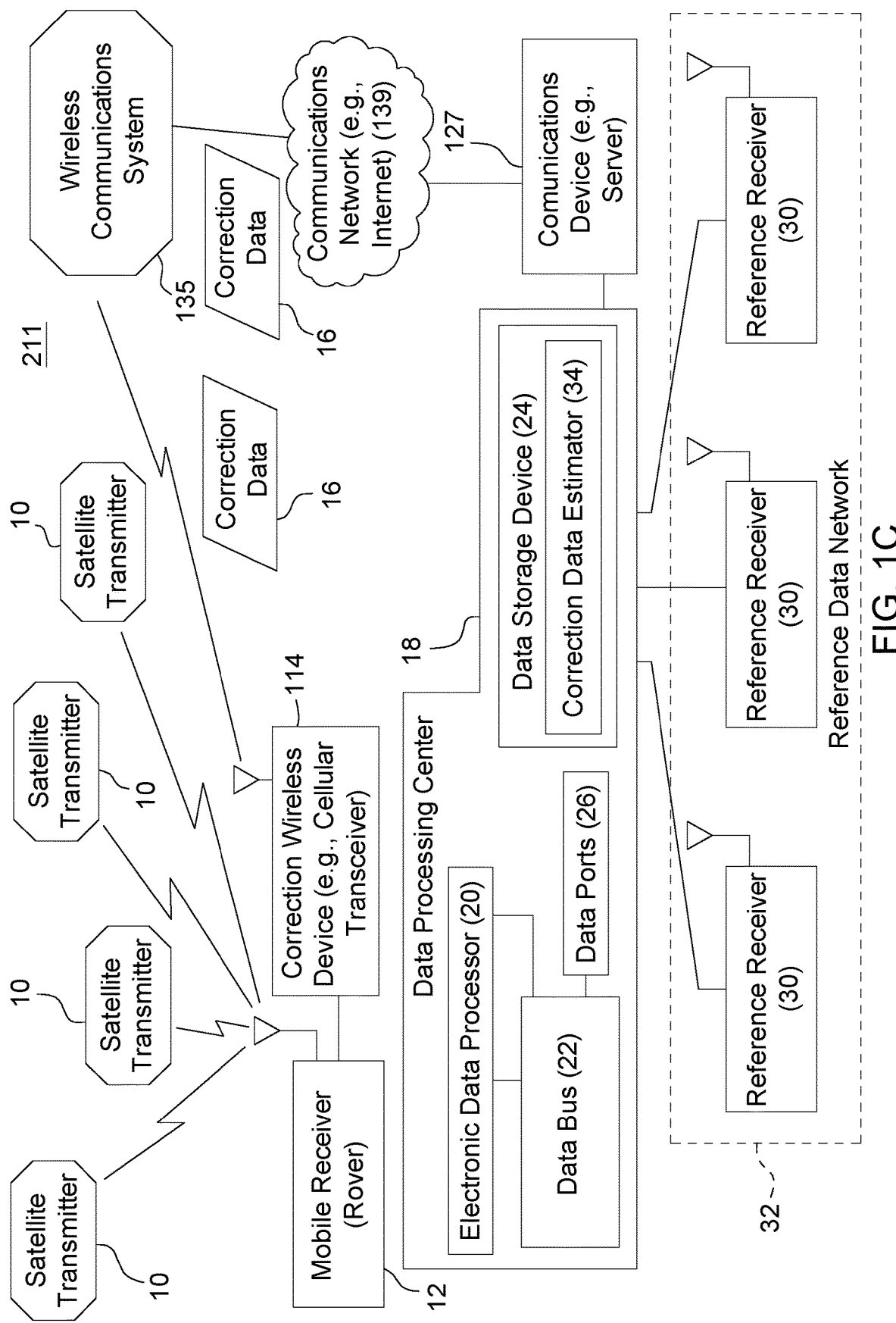
FIG. 1C is an illustrative block diagram of a second embodiment of a GNSS system with the aid of a correction or augmentation system.

The system 211 of FIG. 1C is similar to the system 11 of FIG. 1B except the system of FIG. 1C replaces the communications satellite 35 and the terrestrial uplink station 28 with a communications device 127 (e.g., server), a communications network 139 (e.g., Internet or communications link), and a wireless communications system 135. In one embodiment, the wireless communications system 135 may comprise a cellular communications system, a trunking system, a WiFi communications system, or another communications system. For example, the cellular communications system may comprise cell sites or base stations in communication with a base station controller, a router, or another mobile telephone switching office (MTSO), where the MTSO interfaces with a communications network 139, such as the Internet.

The communications network 139 may comprise microwave links, fiber optical links, the public switched telephone network (PSTN), the Internet, or another electronic communications network. In one embodiment, the communications device 127 comprises a server that formats, organizes or transmits the correction data in data packets (e.g., data packets compatible with TCP/IP Transmission Control Protocol/Internet Protocol) for transmission over the communications network 139. The communications network 139 communicates with the correction wireless device 114 (e.g., cellular transceiver) that is associated with or coupled to the mobile receiver 12.

In this document, under the precise positioning mode of FIG. 1B or FIG. 1C, the mobile receiver 12 can achieve centimeter-level accuracy positioning, by using the real-time global differential correction data 16. This correction data 16 is available and valid globally through either over satellite communications (e.g., L-Band geostationary communication satellite) in FIG. 1B or wireless communications system (e.g., cellular wireless system) in FIG. 1C. The global differential correction under a precise positioning mode, illustrated in the example of FIG. 1B, eliminates the need for local reference stations and radio communication that would otherwise be used to establish short baselines (e.g., less than approximately 20 kilometers to approximately 30 kilometers) between a reference receiver 30 and a mobile receiver 12 for precise position accuracy.

Figure 2:
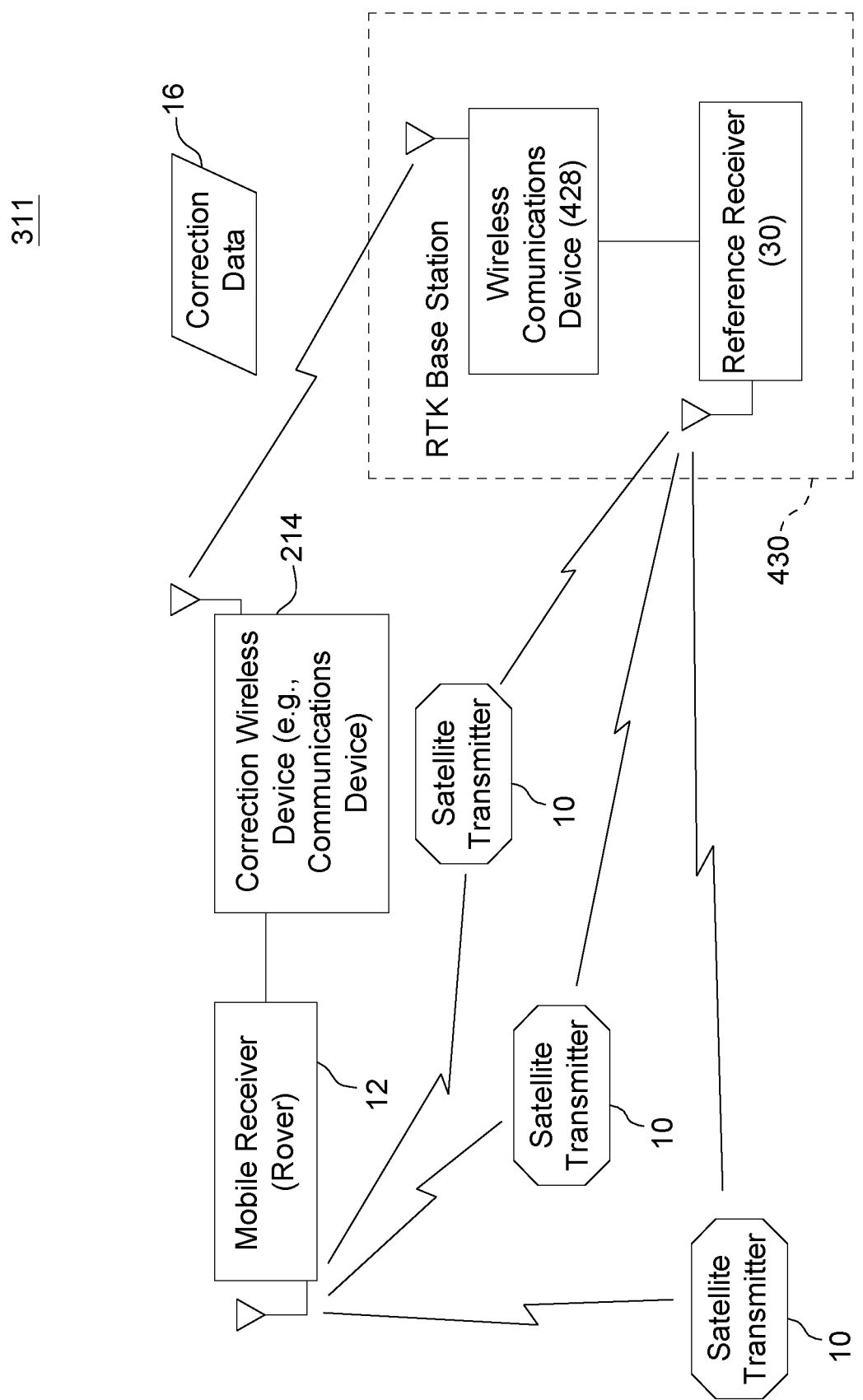
FIG. 2 is a second embodiment of an illustrative block diagram of an RTK base station receiver and rover receiver.

In comparison to FIG. 1B and FIG. 1C, FIG. 2 shows a mobile receiver 12 that operates in the real-time kinematic mode with the provisions of correction data (e.g., local RTK correction data) from a real-time kinematic (RTK) base station 430. Like reference numbers in FIG. 1B, FIG. 1C and FIG. 2 indicate like elements.

In the RTK mode, the accuracy requires visibility of the same set of satellites by the mobile receiver 12 and the reference receiver 30. Moreover, the baseline or separation distance between the mobile receiver 12 and the reference receiver 30 (or RTK base station 430) is limited to short baselines (e.g., less than 20 approximately kilometers to approximately 30 kilometers) for target accuracy as the decimeter or centimeter level.

In contrast, the extended RTK mode (RTKX mode) refers to any mode of operation of the mobile receiver 12 after the RTK correction signal (e.g., between devices 128, 214) is lost, interrupted or corrupted at the mobile receiver 12, as indicated by a correction wireless device 214 (e.g., wireless communications device) or the navigation positioning estimator or the RTKX module. The extended RTK mode may comprise any of the following modes: converged precise positioning mode (e.g., PPP mode), relative positioning mode, and/or float ambiguity resolution in the precise positioning mode, among other possibilities.

Here, in FIG. 2 the RTK base station 430 comprises a reference receiver 30 (e.g., GNNS navigation receiver) and a wireless communications device 428, such as a wireless transceiver or transmitter. The RTK base station 430 or the reference receiver 30 determines RTK correction data, such as an offset vector (e.g., base offset vector) or difference between an observed position of the reference station based on measured carrier phase of the satellite signals and known position or coordinates of the reference receiver 30. The RTK base station 430 or the wireless communications device 428 forwards or transmits the RTK correction data to the mobile receiver 12 via the correction wireless device 214 in real time to support precise position determination and navigation at the mobile receiver.

The wireless communications device 428 (e.g., wireless communications device) may communicate directly with the correction wireless device 214, or via a wireless communications system (e.g., repeater). The correction wireless device 214 may comprise a transceiver or wireless receiver.

In one embodiment in accordance with one possible configuration, an RTK base station 430 or a local reference receiver 30 determines a precise point positioning estimate based on received satellite signals and a precise correction signal. Moreover, the RTK base station 430 or reference receiver 30 can determine the offset vector between the determined precise point positioning estimate and the known reference position (e.g., fixed coordinates of the RTK base station). The offset vector determined by a base station or reference receiver is referred to as a base offset vector or RTK offset bias. The offset vector can be transmitted from the RTK base station 430 to the mobile receiver 12 in real time via the wireless communications device 428 and the correction wireless device 214. Accordingly, in certain configurations, the mobile receiver 12 does not need to determine the offset vector because the RTK base station 430 or reference receiver 12 does.

The advantage of the above configuration is a high quality offset because of the known reference position of the reference receiver 12, but a precise correction signal (e.g., PPP correction data) is required at the reference receiver 12. In other configurations disclosed in this document, the mobile receiver 12 simultaneously determines an RTK solution and a precise position solution and computes an offset vector (e.g., mobile offset vector) between the RTK solution and the precise position solution. The offset vector determined by a mobile receiver or rover is referred to as a mobile offset vector, a rover offset vector or a learned offset vector.

Although one RTK base station 430 is shown in FIG. 2, in alternate embodiments it is possible to use multiple RTK base stations, or even a network of RTK base stations and data processing center that serves a geographic region.

Figure 3:
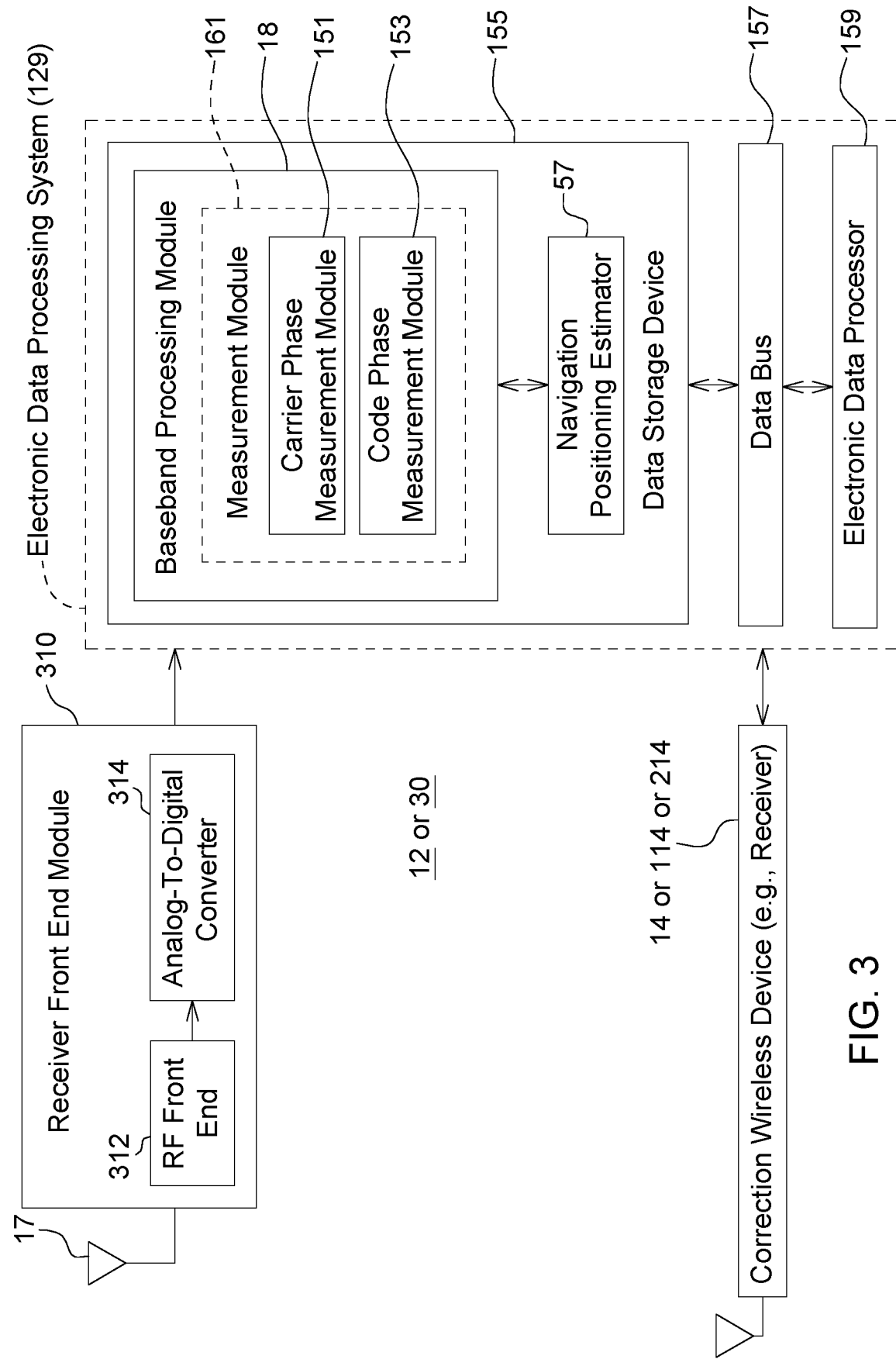
FIG. 3 is a block diagram of one embodiment of rover receiver or base station receiver (e.g., reference receiver as part of a correction-service network).

In accordance with one embodiment, FIG. 3 discloses a system or receiver (12 or 30) (e.g., satellite navigation receiver) capable of reception of received signals that comprise one or more carrier signals (e.g., a first carrier (L1), a second carrier (L2) and a third carrier (L5) of Global Positioning System (GPS)) transmitted by satellites. The received signal is transmitted from a satellite transmitter 10 of one or more satellites, such as a navigation satellite, or such as a Galileo-compatible navigation satellite, (Global Navigation Satellite System) GLONASS or Global Positioning System (GPS) satellite. The satellites have known orbital positions versus time that can be used to estimate the relative position between an antenna 17 of the receiver and each satellite based on the propagation time of one or more received signals between the three or more satellites and the antenna 17 of the receiver.

As used in this document, "CD" shall refer to code and "CR" shall refer to the carrier of the received signal or a digital representation of one or more samples of the received signal. The code comprises a modulating code (e.g., pseudo-random noise code modulated with information) that modulates the carrier.

In accordance with one embodiment FIG. 3 illustrates a receiver (12 or 30) that comprises a receiver front end module 310 coupled to an electronic data processing system 129. The receiver (12 or 30) receives a received signal that comprises one or more carrier signals from a set of satellite transmitters 10. The receiver (12 or 30) may comprise a location-determining receiver for: (a) determining a location of a receiver antenna 17, (b) a range-determining receiver for determining a range or distance between the receiver antenna 17 and a satellite (e.g., satellite antenna 17) or (c) determining ranges between the receiver antenna 17 and one or more satellites, or (d) determining position, velocity, acceleration, and/or attitude (e.g., tilt, roll, yaw) of the antenna 17.

A real-time kinematic base station 430 (in FIG. 2) or reference receiver 30 may provide or transmit wirelessly RTK correction data to the correction wireless device 214. The correction data may comprise position data, phase data, a position offset or phase offset. In one embodiment, the real-time kinematic base station 130 comprises a reference receiver 30 that is the same or similar to the mobile receiver 12, except that the (RTK) reference receiver 30 is located at a known reference position. Accordingly, the RTK reference receiver 30 can have the same blocks and modules as the mobile receiver 12.

In one embodiment, in FIG. 3 a receiver front end module 310 and the radio frequency (RF) front end 312 receive one or more received satellite signals (e.g., of one or more GNSS satellite constellations) at antenna 17. In one embodiment, the RF front end 312 comprises an amplifier, a down-conversion mixer, and a local oscillator. For example, the amplifier comprises radio frequency (RF) or microwave amplifier (e.g., low noise amplifier) that is coupled to the antenna 17 for receiving the received signal that is transmitted from one or more satellites. The amplifier provides an amplified signal to the down-conversion mixer as a first input. The local oscillator provides a signal to the down-conversion mixer as a second input. The down-conversion mixer moves or lowers the signal spectrum of the received signal from RF to an intermediate frequency (IF) or baseband frequency. The down-conversion system may include one or more mixing, amplifying, and filtering stages.

The output of the RF front end 312 is coupled to an analog-to-digital converter 314 (ADC). The ADC 314 converts the analog intermediate frequency signal or analog baseband signal to a digital signal. The digital signal comprises one or more digital samples that are available at a sampling rate. Each sample has a finite quantization level and each sample is capable of being processed by an electronic data processing system 129.

In one embodiment, the electronic data processing system 129 comprises a digital receiver portion. The electronic data processing system 129 can comprise an electronic data processor 159, a data storage device 155 (e.g., electronic memory) and a data bus 157 for communication between the electronic data processor 159 and the data storage device 155, where software instructions and data are stored in the data storage device and executed by the data processor 159 to implement any of the blocks, components or modules (e.g., electronic modules, software modules, or both) illustrated in FIG. 3.

The digital signal outputted by the ADC 314 is fed into the baseband processing module 118. In one embodiment, the baseband processing module 118 comprises a carrier wipe-off module, a local carrier signal generator, a code wipe-off module, a local code generator, correlators, and a data demodulator to process the baseband signals properly.

The data demodulator (e.g., discriminator) provides satellite navigation data (e.g., where publicly accessible to civilians) for estimating a range (e.g., distance between a satellite and the antenna 17) or a position (e.g., in two or three dimensional coordinates) of phase center of the antenna 17. The satellite navigation data or other signal information may comprise one or more of the following information that modulates the baseband waveform of the received signal: date, satellite navigation system time, satellite status, orbital data, ephemeris data, almanac, satellite location, and satellite identifier. The data demodulator may use phase shift keying, phase demodulation, pulse width demodulation, amplitude demodulation, quadrature amplitude demodulation, or other demodulation technique that is consistent with the modulation by the modulator at the satellite transmitter. Further, in certain embodiments, the measurement module 161, the baseband processing module 118, or the electronic data processor 159 may further comprise a atmospheric modeling module 405 (e.g., ionospheric modeling module) that supports one or more ionospheric or atmospheric models for estimating ionospheric error and correction data for one or more carrier phase measurements and/or code phase measurements of corresponding GNSS signals or one or more GNSS satellite channels (e.g., L1, L2 and L5).

Figure 4:
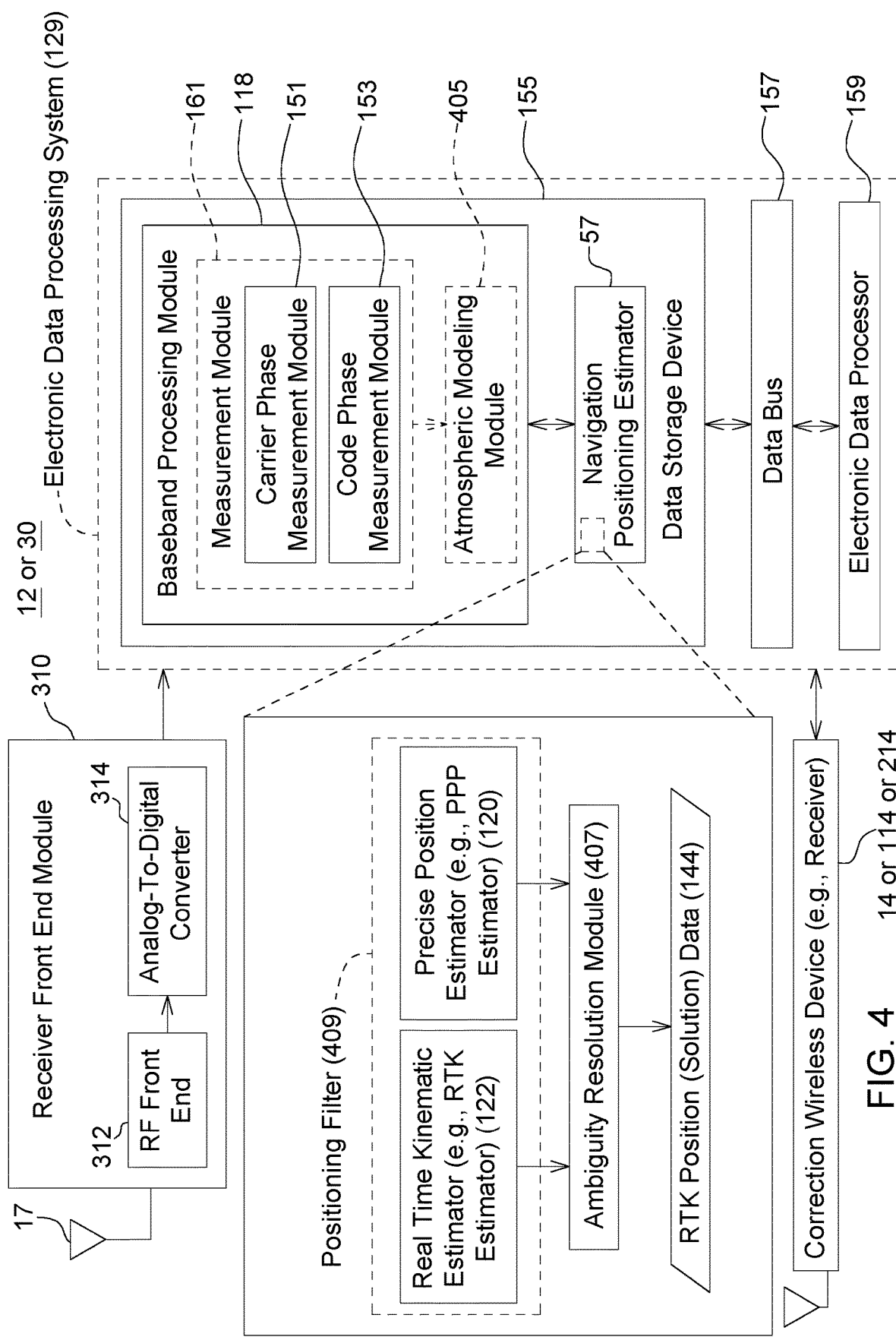
FIG. 4 is a block diagram of one embodiment of a rover receiver or base station receiver in greater detail than FIG. 3.

In one embodiment, the measurement module 161 comprises a carrier phase measurement module 151 and a code phase measurement module 153. The code phase measurement module 153 measures the code phase of one or more received signals, or rather the phase of the pseudo random noise code encoded on one or more received signals. The code phase is not ambiguous in the number of cycles of at the wavelength of the code signal. The carrier phase measurement module 151 measures the carrier phase of one or more received signals. The measured carrier phase is ambiguous as to the integer number of cycles at the receiver (12 or 30). Accordingly, as illustrated in FIG. 4, the navigation positioning estimator 57 may comprise an ambiguity resolution module 407, unless the measurement module 161 is configured to support an ambiguity resolution module.

The navigation positioning estimator 57 determines the position estimate of the receiver antenna 17 based on the measured carrier phases, estimated ranges of the measurement generation module 39 and demodulated data. For example, the navigation positioning estimator 57 or the positioning engine may use ranges from four or more satellites to determine the position, velocity, or acceleration of the antenna 17 of the receiver in two or three dimensions.

In one embodiment, the navigation positioning estimator 57 estimates the propagation time between transmission of a satellite signal from a certain satellite to the receiver antenna 17 and converts the propagation time into a distance or range proportional to the speed of light. In the digital receiver portion, the receiver (12 or 30) or its data processing system 129 may comprise hardware and software instructions. For example, in one illustrative embodiment the hardware comprises a data processor 159 that communicates to a data storage device 155, which stores software instructions, via one or more data buses 157.

In the data processing system 129, the data processor 159 may comprise one or more of the following: an electronic data processor, a microprocessor, a microcontroller, an application specific integrated circuit (ASIC), digital signal processor (DSP), a programmable logic device, an arithmetic logic unit, or another electronic data processing device. The data storage device 155 may comprise electronic memory, registers, shift registers, volatile electronic memory, nonvolatile random access memory, a magnetic storage device, an optical storage device, or any other device for storing data. The data processor 159 may be coupled to the data storage device 155 via one or more data buses, which support communication between the data processor 159 and the data storage device 155.

In general, the electronic data processing system 129 comprises an electronic data processor, digital logic circuits, multiplexers, multipliers, digital filters, integrators, delay circuits, oscillator, signal generator, pseudo-noise (PN) code sequence generator, registers, shift registers, logic gates, or other hardware. The electronic data processing system 129 may support storage, retrieval and execution of software instructions stored in a data storage device.

In one embodiment, the navigation positioning estimator 57 estimates a position of the receiver antenna 17 based on the measured carrier phase and the correction data received via the correction wireless device (14, 114, 214) (e.g., satellite receiver, such as an L-band satellite receiver). In one embodiment, the navigation positioning estimator 57 comprises one or more of the following: a real-time kinematic position estimator 122 and a precise position estimator 120 (e.g., PPP estimator), and an ambiguity resolution module 407 consistent with FIG. 4.

FIG. 4 is a block diagram of another embodiment of a receiver for switching between real-time kinematic mode and precise positioning mode; FIG. 4 shows the navigation positioning estimator 57 in greater detail than FIG. 3. Like reference numbers in FIG. 3 and FIG. 4 indicate like elements, modules or features.

Figure 5A:
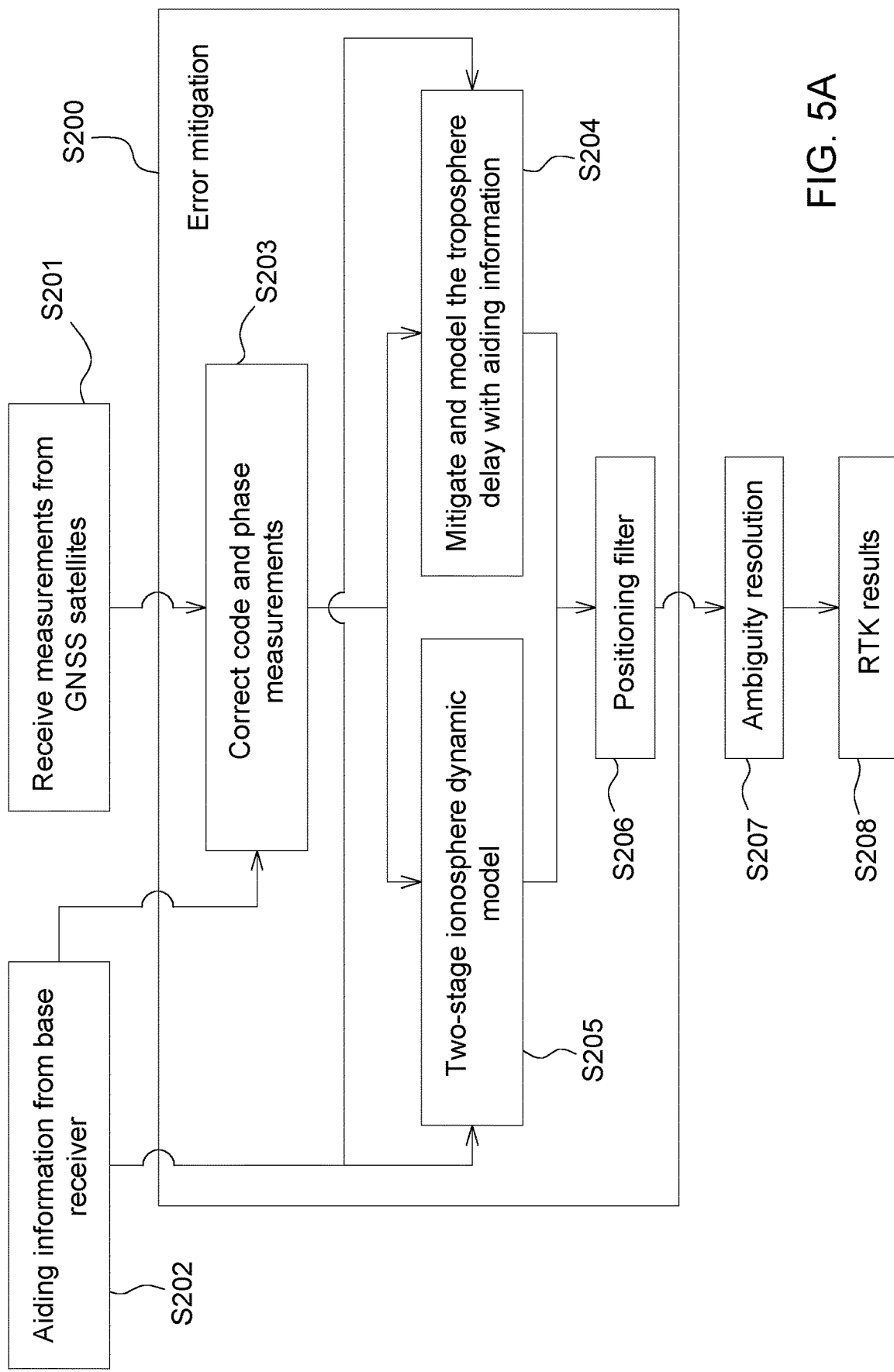
FIG. 5A is a flowchart of one embodiment of a method of estimating a position based on a dual ionospheric model.
Figure 6:
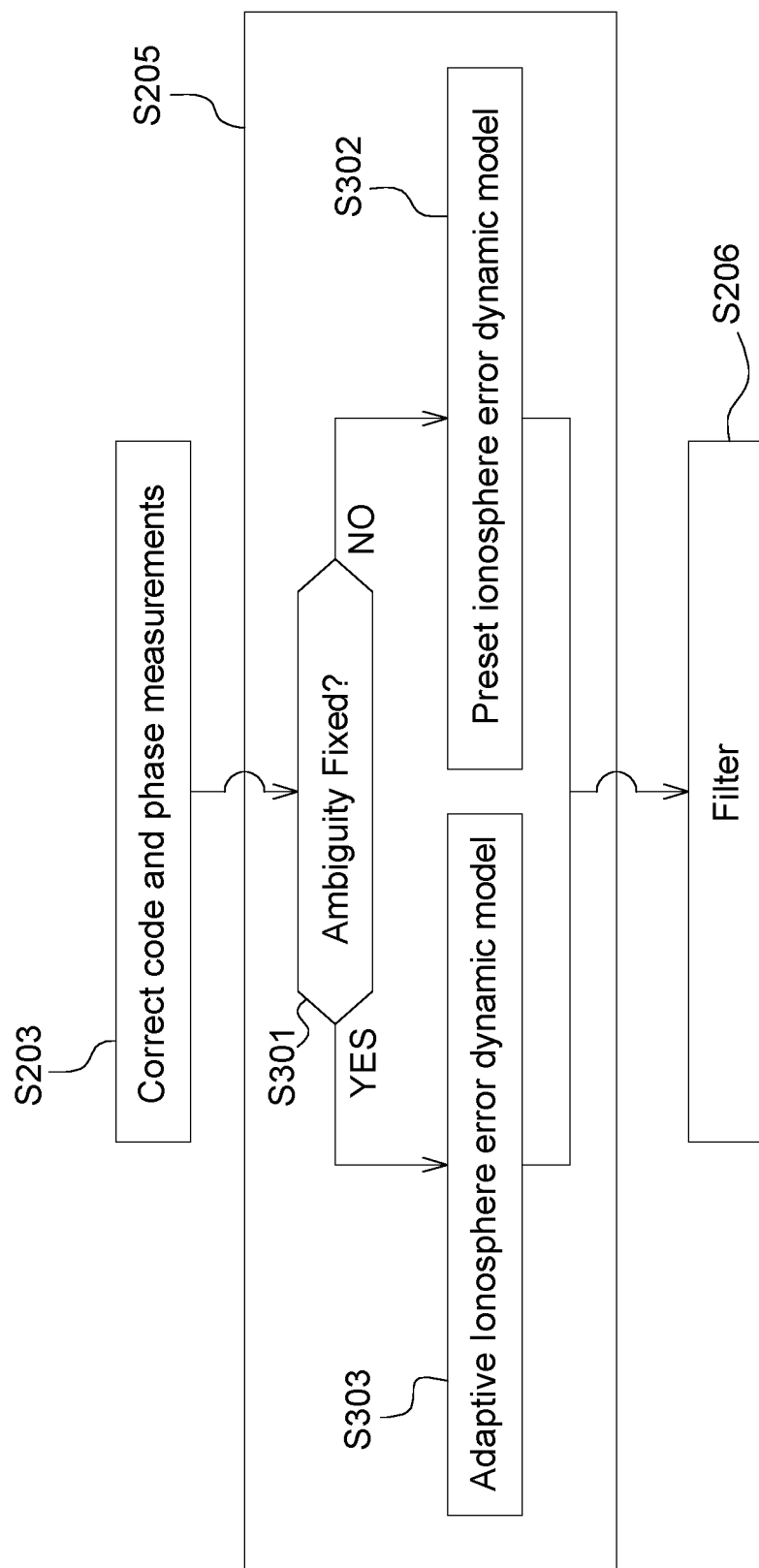
FIG. 6 is a detailed flowchart of one embodiment of a method for demonstrating an example for the dual (e.g., two stage) atmosphere residual estimation.
Figure 7:
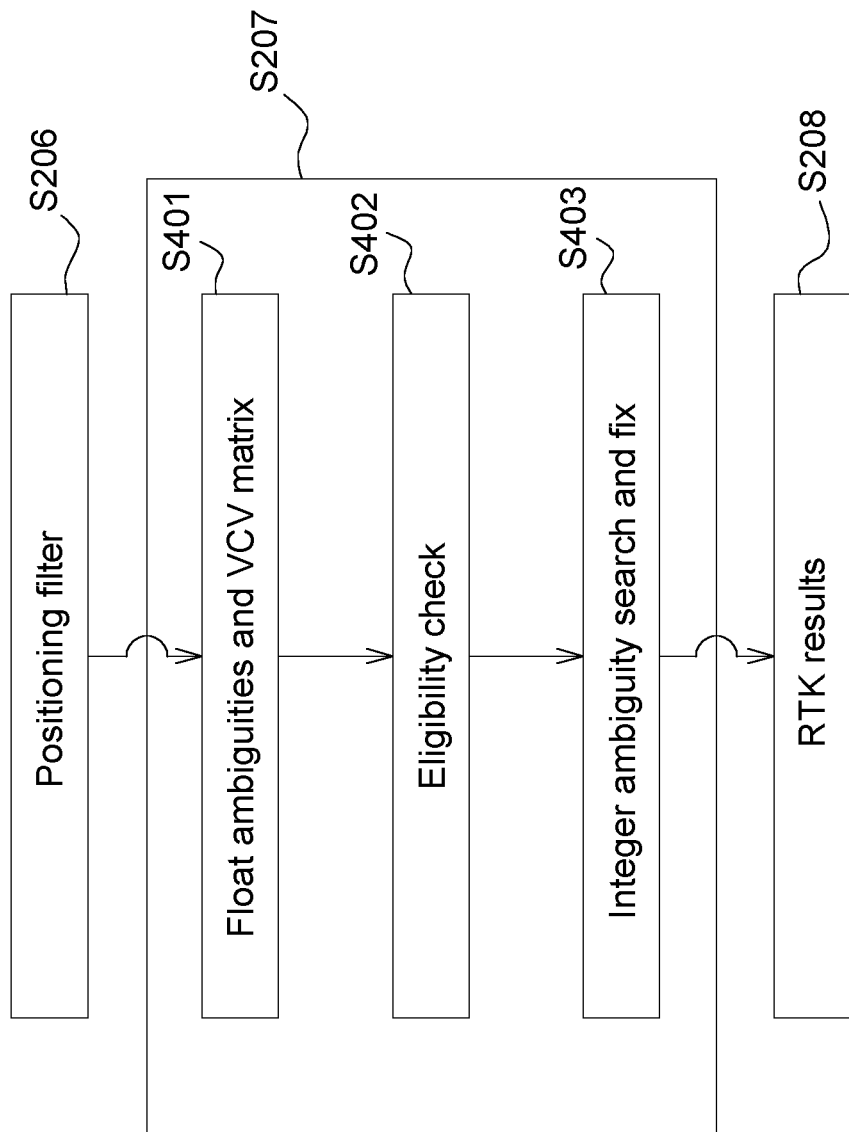
FIG. 7 is a detailed flowchart of one embodiment of a method for reliable ambiguity resolution, such as an improved, efficient search process by limiting the search space.

As illustrated in FIG. 4, the navigation positioning estimator 57 comprises a real-time kinematic (RTK) estimator 122, a precise position estimator 120 (e.g., PPP estimator), and the ambiguity resolution module 407, which can support any of the following: step S207 in FIG. 5A, step S301 in FIG. 6, and step S207 in FIG. 7. The precise position estimator 120 and the RTK estimator 122 may output any of the following output data: position estimates (alone or along with corresponding variance estimates), velocity estimates, motion estimates or heading estimates. In one embodiment, the precise position estimator 120 and the RTK estimator 122 provide output data to the RTK extend module 409.

FIG. 5A is a flow chart of one embodiment of a method for an illustrative dual (e.g., two stage) adaptive RTK engine.

In step S201, the RTK engine, electronic data processor 159 or GNSS rover receiver 12 receives GNSS measurements from GNSS satellite 101. For example, the RTK engine, electronic data processor 159 or GNSS rover receiver 12 receives carrier phase measurements and code phase measurements for each channel or each satellite signal of a given corresponding satellite. Further, carrier phase measurements of at least four satellites are generally required for an accurate two-dimensional position estimate or three-dimensional position estimate of the antenna of the GNSS rover receiver 12.

In step S202, the RTK engine, data processor 159 or GNSS rover receiver 12 obtains RTK correction data and/or aiding data from base station receiver (30, 105) (e.g., reference receiver). For example, the GNSS base station receiver 30 (e.g., reference receiver) of the RTK system is configured to generate aiding information, where the base station receiver 30 (e.g., reference receiver) is located at a known location or fixed, stationary position. A wireless link may comprise a first wireless communications device and a second wireless communications device that communicate over a wireless channel, which may support communications over the baseline distance between the GNSS base station and rover receiver 12.

In step S203, the RTK engine, data processor 159 or GNSS rover receiver 12 corrects or reduces errors in code phase measurements and/or carrier phase measurements based on the obtained correction data via the wireless link. For example, the GNSS base station receiver 30 provides correction data or aiding information to the GNSS rover receiver 12 via the wireless link such that the GNSS rover receiver 12 can mitigate (e.g., reduce or compensate for) errors in the carrier phase measurements (and code phase measurements) with the aiding information.

In one embodiment, in step S203, the code phase measurements and carrier phase measurements can be corrected by differencing the measurement between base and rover as described by below equations of Equation Set 1:

$$\Delta P_i = P_{bi} - P_{ri} = \Delta\rho + \Delta d_t + \Delta d_{trop} - \frac{\Delta d_{ion}}{f_i^2} + \Delta\sigma_{Pi} \quad (1)$$

$$\Delta L_i = L_{bi} - L_{ri} = \Delta\rho + \Delta d_t + \Delta d_{trop} + \frac{\Delta d_{ion}}{f_i^2} + \lambda_i \Delta N_i + \sigma_{Li}$$

where $\Delta P_i$ is the single difference of the pseudo-range measurements (e.g., expressed in time units or expressed in distance units) between the base station receiver 30 and rover receiver 12 for frequency index i: P is the pseudo-range measurement (e.g., of code phase); $\Delta L_i$ is the single difference of the carrier phase measurements (e.g., expressed in time units or in distance units) between the base station receiver 30 (e.g., reference receiver) and rover receiver 12 for frequency index i; L is the carrier phase range measurement, $\rho$ is the geometric range between a receiver (e.g., base station receiver 30 or rover receiver 12) to satellite; $\Delta\rho$ is the difference between the geometric range from the base station receiver 30 to the satellite and the geometric range from the rover receiver 12 to the satellite; subscript b represents base station receiver 30 (e.g., base receiver), subscript r represents the mobile or rover receiver 12, and subscript i represents frequency index; $d_t$ is receiver clock error; $\Delta d_t$ is clock error term between the receiver clock and the satellite clock (e.g., expressed in time units or distance units); $d_{trop}$ is tropospheric delay; $\Delta d_{trop}$ is a tropospheric error term between the base station receiver 30 and the rover receiver 12, $d_{ion}$ is ionospheric delay; $\Delta d_{ion}$ is an ionospheric error term (e.g., sometimes modeled as a constant, k) between the base station receiver 30 and the rover receiver 12; f is measurement frequency (e.g., or frequency index); λ is wavelength of the satellite signal and $\lambda_1$ is the wavelength (e.g., in units of meters) of the satellite signal at frequency index i; N is an integer ambiguity (e.g., and generally has an integer value) in the number of wavelengths (e.g., for carrier phase measurements) and $\Delta N_i$ is a difference in the integer ambiguity (in carrier phase measurements for frequency or frequency index i) between the integer ambiguity observed at the base receiver and the rover receiver 12; σ is measurement error includes multi-path error and measurement noise.

In Equation Set 1, the upper equation addressed code phase, whereas the lower equation addresses carrier phase. The code phase has no integer ambiguity, but is generally less precise than carrier phase that has an inherent integer ambiguity in the integer number of wavelengths between the GNSS satellite antenna of the satellite and the GNSS receiver antenna of the GNSS receiver (e.g., base station and/or rover receiver 12). Any of above terms or above parameters of Equation Set 1 may be expressed in time units (e.g., seconds) or in phase units (e.g. radians) of the received signal. To express a term in distance units, such as meters, the parameter or term in time units (e.g., seconds) is multiplied by c, the speed of light (e.g., approximately $3 \times 10^8$ meters/second), to convert to distance units, such that the units of measurement are consistent in Equation Set 1.

The frequency index, $f_i$, may comprise any of the following: (a) a positive integer that represents a particular signal or channel frequency of a satellite, (b) a frequency index or coefficient that adjusts the ionospheric delay based on factors, such as refractive ionospheric delay, diffractive ionospheric delay, or both, (c) frequency index based on frequency-dependent ionospheric refraction, which is generally proportion to the inverse of the frequency index squared and which can be eliminated by conventional ionospheric-free combinations of at least two carrier phase measurements or two code phase measurements, (d) a frequency scintillation index value, such as a frequency-dependent coefficient based on total electron count (TEC) or based on the (unitless) intensity of total electron count variations.

In another embodiment, code phase measurements and carrier phase measurements can be corrected in step S203 by subtracting the measurement range errors (e.g., pseudo-range measurement errors in code phase, which are referred to as $\delta P_{bi}$; or range measurements errors in carrier phase, which are referred to as $\delta L_{bi}$) calculated from base measurements of one or more base station receiver 30 s (e.g., RTK base station receiver 30 s at known two or three dimensional positions) from the rover pseudo-range measurements, where the outcome of this method can be described in Equation Set (2):

$$P_i = P_{ri} - \delta P_{bi} = \rho + \Delta d_t + \Delta d_{trop} - \frac{\Delta d_{ion}}{f_i^2} + \Delta \sigma_{Pi} \quad (2)$$

-continued $$\Delta L_i = L_{ri} - \delta L_{bi} = \rho + \Delta d_t + \Delta d_{trop} + \frac{\Delta d_{ion}}{f_i^2} + \lambda_i \Delta N_i + \sigma_{Li}$$

where $P_i$ is the pseudo-range measurement (e.g., expressed in distance or time) between the base station receiver 30 and rover receiver 12 for frequency index i; $P_{ri}$ is the pseudo-range measurement (e.g., of code phase) for a rover receiver 12 operating at the same frequency index i as the base station receiver 30 $\delta P_{bi}$ is the change in the pseudo-range measurement (e.g., of code phase) for a base station receiver 30 b at frequency index (e.g., signal or channel); ρ is the geometric range between a receiver (e.g., base station receiver 30 or rover receiver 12) to satellite; $\Delta d_t$ is clock error term between the receiver clock and the satellite clock (expressed in units time or geometric distance); $\Delta d_{trop}$ is a tropospheric error term between the base station receiver 30 and the rover receiver 12, $d_{ion}$ is ionospheric delay; $\Delta d_{ion}$ is an ionospheric error term (e.g., sometimes modeled as a constant, k) between the base station receiver 30 and the rover receiver 12; $f_i$ is measurement frequency (e.g., or frequency index); $\Delta \sigma_{Pi}$ is change in measurement error, which includes multi-path error and measurement noise for the pseudo-range measurement or code phase measurement at frequency index i.

$$L_i = L_{ri} - \delta L_{bi} = \rho + \Delta d_t + \Delta d_{trop} + \frac{\Delta d_{ion}}{f_i^2} + \lambda_i \Delta N_i + \sigma_{Li}$$

Similarly, in the above carrier phase equation (lower equation) of Equation Set 2, where $L_i$ is the carrier phase range measurement at frequency or frequency index i; $L_{ri}$ is the carrier phase range measurement for a rover receiver 12 operating at the same frequency or frequency index i as the base station receiver 30; $\delta L_{bi}$ is the change in the carrier phase range measurement for a base station receiver 30 (i.e., b) at frequency or frequency index (e.g., signal or channel) i; ρ is the geometric range between a receiver (e.g., base station receiver 30 or rover receiver 12) to satellite; $\Delta d_t$ is clock error term between the receiver clock and the satellite clock (expressed in units time or geometric distance); $\Delta d_{trop}$ is a tropospheric error term between the base station receiver 30 and the rover receiver 12; $\Delta d_{ion}$ is an ionospheric error term (e.g., sometimes modeled as a constant, k) between the base station receiver 30 and the rover receiver 12; $f_i$ is measurement frequency (e.g., or frequency index); Ai is the wavelength (e.g., in units of meters) of the satellite signal at frequency index i; N is an integer ambiguity (e.g., and generally has an integer value) in the number of wavelengths (e.g., for carrier phase measurements) and $\Delta N_i$ is a difference in the integer ambiguity (in carrier phase measurements for frequency or frequency index i) between the integer ambiguity observed at the base receiver 30 and the rover receiver 12; $\sigma_{Li}$ is measurement error includes multi-path error and measurement noise for carrier phase measurement at frequency i or frequency index i.

In step S204, the RTK engine, data processor 159 or GNSS rover receiver 12 mitigates or reduces error associated with tropospheric delay based on the aiding information 121. The RTK engine, data processor 159 GNSS rover receiver 12 is configured to model data for the positioning filter of step S206.

In step 205, the RTK engine, data processor 159 or GNSS rover receiver 12 is configured to model ionospheric properties associated with a given propagation path between any satellite and the rover receiver 12 in accordance with an ionospheric model that can estimate and/or mitigate one or more of the following: ionosphere delay, ionospheric amplitude shifts in the received carrier signal of a respective satellite, ionospheric phase shifts in the received carrier signal of a respective satellite, ionospheric amplitude shifts in the code (e.g., navigation information, such as CNAV, CNAV-2, course-acquisition code (C/A) or L1C code) encoded on the received carrier signal of a respective satellite, and ionospheric phase shifts of the receiver.

In step S206, the RTK engine, error estimator, electronic data processor 159 or GNSS rover receiver 12 is configured to apply a positioning filter with a dual (e.g., two stage) error model or a dual (e.g., two stage) adaptive statistical model. For example, the RTK engine, error estimator, electronic data processor 159 or GNSS rover receiver 12 is configured to apply a positioning filter with a dual (e.g., two stage) error model or a dual (e.g., two stage) adaptive statistical model to estimate residual errors and to fix or to resolve carrier phase ambiguities (e.g., at a minimum target fix rate). In one embodiment, the dual (e.g., two stage) adaptive statistical model is based on a tropospheric model and ionospheric model constructed in step S204. In Equation Sets (1) and (2), the receiver clock residual $\Delta d_r$, troposphere residual $\Delta d_{trop}$ and ionosphere delay residual $$\frac{\Delta d_{ion}}{f_i^2}$$

will have substantially similar magnitude impact for code phase and carrier phase and need to be properly handled in step S206 by a positioning filter. However, the carrier phase may be advanced and the code phase may be delayed.

With respect to the tropospheric model and ionospheric model, the unknowns can be estimated by a positioning filter in step S206. For example, the positioning filter may comprise a Kalman filter, an extended Kalman filter or another predictive filter. A Kalman filter is a predictive design that uses summation of signals, delay and feedback to process sampled data and to reduce or minimize contributions of noise and uncertainty, such as in the context of estimating position data or atmospheric propagation error (e.g., ionospheric error or bias) associated with pseudo-range of code phase measurements or range associated with carrier phase measurements.

In step S207, RTK engine, GNSS receiver, or data processor 159 searches for integer ambiguities to identify fixed or resolved integer ambiguities for each singled differenced carrier phase measurements of corresponding received satellite signals based on the float states and variance covariance information calculated by positioning filter in step S206. Alternately in another embodiment, RTK engine, GNSS receiver, or data processor 159 searches for integer ambiguities to identify fixed or resolved integer ambiguities for each singled differenced carrier phase measurements of corresponding received satellite signals based on the float states and variance covariance information calculated by positioning filter in step S206.

In step S208, the RTK engine, GNSS receiver or data processor 159 is configured to estimate final RTK positioning results, such as two or three dimensional coordinates, position estimates, motion estimates (e.g., velocity and acceleration) and heading angle estimates. In an alternate embodiment, the RTK, GNSS receiver or data processor 159, alone or together with a multi-axis accelerometer, gyroscope or inertial measurement unit (IMU), is configured to estimate further parameters, such as attitude, roll angle, tilt angle, and yaw angle, or changes in roll angle, tilt angle or yaw angle.

In FIG. 5A, the troposphere residual $\Delta d_{trop}$ is the difference between base tropospheric delay and rover tropospheric delay and can be described by the following Equation (3):

$$\Delta d_{trop} = d_{tropR} - d_{tropB} = M_R d_{tropR}^Z - M_B d_{tropB}^Z \qquad (3)$$

where $\Delta d_{trop}$ is a tropospheric error term between the base station receiver 30 and the rover receiver 12; $d_{tropR}$ is the tropospheric delay observed at the rover receiver 12; $d_{tropB}$ is the tropospheric delay observed at one or more base station receivers 30; M is an atmospheric or tropospheric mapping function; $M_B$ is the atmospheric mapping function for the base station receiver 30 and $M_R$ is the atmospheric mapping function for the rover receiver 12; the superscript Z represent the zenith direction; $d_{tropR}^Z$ is the tropospheric delay observed at the rover receiver in the zenith direction; $d_{tropB}^Z$ is the tropospheric delay observed at the base station receiver in the zenith direction.

For example, the mapping function M is generally related to satellite elevation angle of a particular satellite signal that is received at a GNSS receiver (e.g., rover or receiver); hence, if the rover receiver 12 is close enough to the base station receiver 30 or if the baseline (between the rover receiver 12 and base station receiver 30) is at or below a maximum baseline threshold distance (e.g., less than 50 Kilometers), $M_B$ and $M_R$ tend to be so similar that base station receiver 30 and rover receiver 12 can share a same mapping function for engineering simplicity. However, as the baseline or distance between base station receiver 30 and rover receiver 12 becomes great enough, or greater than the maximum baseline threshold distance (e.g., equal to or greater than approximately 50 Km), the difference between $M_B$ and $M_R$ will not be negligible anymore and needs to be considered and treated properly.

Accordingly, in one embodiment, zenith troposphere delay and mapping function, $M_B$, of or from the base station receiver 30 will be applied, by the rover receiver 12, to the measurement and the troposphere delay residual in the corrected rover measurement becomes Equation (4) as follows:

$$\Delta d_{trop} = d_{tropR} = M_R d_{tropR}^Z \qquad (4)$$

where $\Delta d_{trop}$ is a tropospheric error term between the base station receiver 30 and the rover receiver 12; $d_{tropR}$ is the tropospheric delay observed at the rover receiver 12; M is an atmospheric or tropospheric mapping function; $M_B$ is the atmospheric mapping function for the base station receiver 30 and $M_R$ is the atmospheric mapping function for the rover receiver 12; the superscript Z represent the zenith direction; $d_{tropR}^Z$ is the tropospheric delay observed at the rover receiver in the zenith direction.

In another embodiment, zenith tropospheric delay from the base station receiver 30 can be applied on both base station receiver 30 and rover receiver 12 measurements. Further, to the extent the base station measurements apply a base mapping function, $M_B$, then the tropospheric residual, $\Delta d_{trop}$, becomes:

$$\Delta d_{trop} = d_{tropR} - M_R d_{tropB}^Z = M_R \Delta d_{trop}^Z \qquad (5)$$

where $\Delta d_{trop}$ is a tropospheric error term between the base station receiver 30 and the rover receiver 12; $d_{tropR}$ is the tropospheric delay observed at the rover receiver 12; $M_R$ is the atmospheric or tropospheric mapping function for the rover receiver 12; the superscript Z represent the zenith direction; $d_{tropB}^Z$ is the tropospheric delay observed at the base station receiver in the zenith direction; $d_{trop}^Z$ is the tropospheric delay (e.g., observed at the rover receiver in the zenith direction); the superscript Z represent the zenith direction.

In another embodiment, zenith troposphere delay from base station receiver 30 can be ignored and Equation (5) can be applied the rover mapping function, $M_R$, for engineering approximation.

As shown in Equation (1) and (2), ionosphere delay is related to the frequency of the measured signal, so it is observable provided multi-frequency measurements are available. By differencing the carrier phase measurements from different frequencies, denoted by subscripts i and j, for frequency i as $f_i$ and frequency j as $f_j$, a Geometry Free (GF) measurement can be formed as below:

$$L_{ij} = L_i - L_j = \frac{\Delta d_{ion}}{f_i^2} - \frac{\Delta d_{ion}}{f_j^2} + \lambda_i \Delta N_i - \lambda_j \Delta N_j + \sigma_{ij} \qquad (6)$$

where $L_{ij}$ is the differenced carrier phase range measurement between the carrier phase measurement at frequency i (e.g., frequency index i) and frequency j (e.g., frequency index j); $L_i$ is the carrier phase range measurement at frequency i (e.g. frequency index i); $L_j$ is the carrier phase range measurement (e.g., at frequency index j); $\Delta d_{ion}$ is an ionospheric error term (e.g., sometimes modeled as a constant, k) between the base station receiver 30 and the rover receiver 12; $f_i$ is measurement frequency at frequency i (e.g., or frequency index i); $f_j$ is measurement frequency at frequency j (e.g., or frequency index j); $\lambda_1$ is the wavelength (e.g., in units of meters) of the satellite signal at frequency i (e.g., or frequency index i); $\lambda_j$ is the wavelength (e.g., in units of meters) of the satellite signal at frequency j (e.g., or frequency index j); $\lambda N_i$ is a difference in the integer ambiguity in carrier phase measurements at frequency i (e.g., or frequency index i) between the integer ambiguity observed at the base receiver and the rover receiver 12; $\Delta N_j$ is a difference in the integer ambiguity in carrier phase measurements at frequency j (e.g., or frequency index j) between the integer ambiguity observed at the base receiver and the rover receiver; $\sigma_{ij}$ is the measurement error includes multi-path error and measurement noise associated with the frequencies i and j (or frequency indices i and j).

GF combination (6) contains ionosphere delay, carrier phase ambiguity and multi-path information and they are not separable. However, it can generally be assumed that the carrier-phase ambiguities won't change with respect to time as long as there have no cycle slips in the carrier phase detection; hence, a time-differenced GF carrier phase solution between time t and time k, $\Delta L_{ij}$, can be generated as following equation:

$$\Delta L_{ij} = (L_{ij}^t - L_{ij}^k)/(t-k) = \frac{\Delta \dot{d}_{ion}}{f_i^2} - \frac{\Delta \dot{d}_{ion}}{f_j^2} + \Delta \sigma_{ij} \qquad (7)$$

where the carrier phase measurements for frequency i and j at time t, $L_{ij}^t$, and carrier phase measurements for frequency i and j at time k, $L_{ij}^k$, are differenced, and where the dot above the $\Delta \dot{d}_{ion}$ indicates a time derivative or a change rate in ionospheric error term between time t and k, which in practice may be negligible; where the dot above $\dot{d}_{ion}$ indicates a time derivative or change rate in ionospheric delay between time t and k; $f_i$ is measurement frequency i (e.g., or frequency index i); $f_j$ is measurement frequency j (e.g., or frequency index j); where $\Delta \sigma_{ij}$ is the change in measurement error (e.g., that includes multi-path error and measurement noise) for frequencies i and j at between t and at time k. Accordingly, the time-differenced GF solution only contains ionosphere gradient and double-differenced multi-path and measurement noise. If multi-path and measurement noise is negligible, $\Delta L_{ij}$, can be used to predict ionospheric change.

Figure 5B:
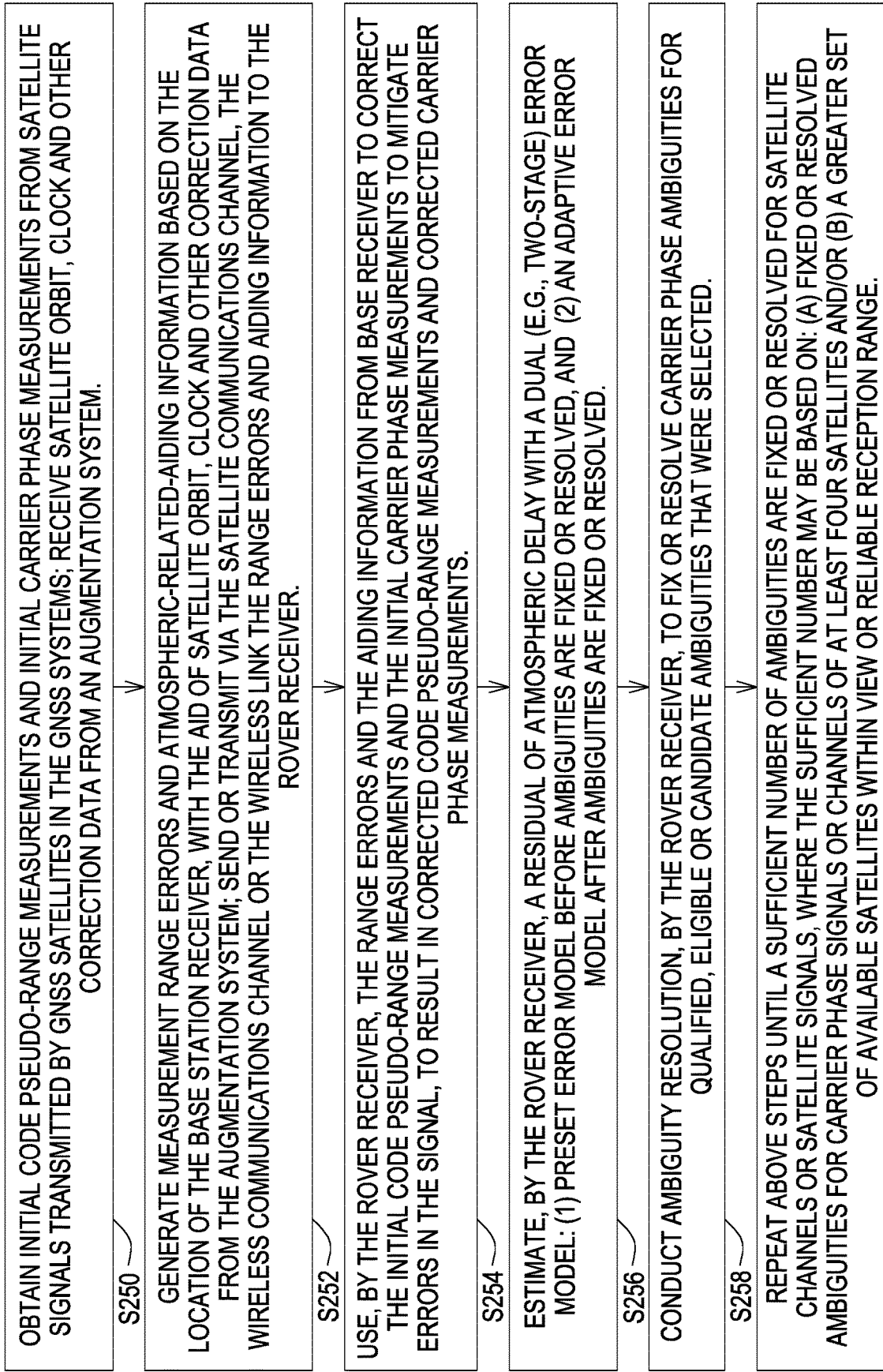
FIG. 5B is a flowchart of another embodiment of a method of estimating a position based on a dual ionospheric model.

FIG. 5B is another embodiment of a flowchart showing a basic method of implementing the present disclosure. In one aspect of FIG. 5B, a method for Long Range Real Time Kinematic positioning has GNSS systems with a plurality of GNSS satellites, where a base GNSS receiver is located at a known location. The method of FIG. 5B begins in step S250.

In step S250, a base station receiver 30 and a rover receiver 12 are configured to obtain initial code pseudo-range measurements and initial carrier phase measurements from satellite signals transmitted by GNSS satellites in the GNSS systems. For example, a measurement module 161 is configured to obtain initial code pseudo-range measurements and initial carrier phase measurements from the signals transmitted by GNSS satellites. Further, the base station receiver 30 and the rover receiver 12 are configured to receive satellite orbit, clock and other correction data from an augmentation system, which can provide the correction data to one or more receivers (e.g., rover receivers) via a satellite communications channel or another wireless communications channel (e.g., of wireless link). For instance, a correction wireless device (14, 114, 214) is associated with to the rover receiver and another wireless communications device (428) is associated with base station receiver (e.g., reference receiver 30); the correction wireless device (14, 114, 214) is configured to receive satellite orbit and clock corrections from an augmentation system via: (a) the wireless device 428 over a communications channel (in FIG. 2), (b) communication satellite 35 (in FIG. 1B) and/or (c) a wireless communications system 135 (in FIG. 1C).

In one example for carrying out step S250, the base station receiver operates in a precise point positioning (PPP) mode with the aid of augmentation system or single point Real-Time-Kinematic (RTK) positioning mode without the aid of augmentation system to generate atmospheric-related aiding information. Further, the atmospheric related aiding information from base station receiver includes any of the following: tropospheric delay data, ionospheric delay data, and ambiguity resolution aiding data for carrier phase ambiguities resolution or fixing.

In step S252, the base station receiver 30 or correction data estimator 34 of the data processing center 18 of FIG. 1C is configured to generate measurement range errors (e.g., for the carrier phase measurements) and atmospheric-related-aiding information based on the location (e.g., pre-surveyed coordinates) of the base station receiver 30, with the aid of satellite orbit, clock and other correction data from the augmentation system. Further, the base station receiver 30 is configured to send or transmit via the satellite communications channel, the wireless communications channel, or the wireless link the range errors and aiding information to the rover receiver 12, where the wireless link comprises any functional combination of the correction wireless device (14, 114, 214), the wireless device 428, the communication satellite 35 and/or the wireless communications system 135.

In step S254, the rover receiver 12, the measurement module 161, or the electronic data processor 159 is configured to use the range errors (e.g., in the carrier phase measurements and/or the code phase measurements) and the aiding information from base station receiver 30 to correct the initial code pseudo-range measurements and the initial carrier phase measurements to mitigate errors in the signal, to result in corrected code pseudo-range measurements and corrected carrier phase measurements. Step S254 may be carried out in accordance with several examples, which may be executed separately or cumulatively.

Under a first example, to correct pseudo-range or code phase measurements and carrier phase measurements, the data processor 159 or measurement module 161 is configured to apply range errors and slant atmospheric delay of base station receiver to adjust or correct code phase measurements and carrier phase measurements of the rover receiver.

Under a second example, the data processor 159 or measurement module 161 is configured to obtain, estimate or determine the slant atmospheric delay is from the estimated slant delay of the base station receiver for each code phase or carrier phase measurement in the aiding information.

Under a third example, the data processor 159, measurement module 161 or atmospheric modeling module 405 is configured to the obtain, estimate or determine slant atmospheric delay is by multiplying base zenith atmospheric delay received from aiding information and the mapping function of each carrier phase and code phase measurement.

Alternately in step S254, the data processor 159 or measurement module 161 is configured to generate range errors (in carrier phase and/or code phase) associated with real-time-kinematic (RTK) processing and, at rover receiver, the atmospheric modeling module 405 or data processor 159 is configured to generate atmospheric (e.g., tropospheric, ionospheric or both) related aiding information are generated based on any of the following: the received raw measurements from base station receiver, the augmentation information, the known location in two or three dimensional coordinates, and atmospheric related data observations from carrier phase and/or code phase measurements. For example, the base station receiver sends, via a wireless communications channel, raw phase measurements, raw code measurements and known location coordinates instead of range errors to the rover receiver along with aiding information.

In step S256, the rover receiver 12, electronic data processor 159, measurement module 161, or positioning filter 409 (e.g., that incorporates a dual error model), or the atmospheric modeling module 405 is configured to estimate a residual of atmospheric delay with a dual (e.g., two-stage) error model: (1) preset error model before ambiguities are fixed in step S258, and (2) an adaptive error model after ambiguities are fixed in step S258. The dual error model becomes a two-stage error model, if multiple iterations of the dual model are used to apply both the preset error model before ambiguities are fixed for a satellite channel, a satellite signal, a set of satellite channels, a set of satellite signals, or a threshold number of satellites; and the adaptive error model after ambiguities after ambiguities are fixed for a satellite channel, a satellite signal, a set of satellite channels, a set of satellite signals. For example, for each epoch or measurement interval, the rover receiver 12 decides which error model is applied to for a satellite channel, a satellite signal, a set of satellite channels, a set of satellite signals, or a given satellite.

Step S256 may be carried out in accordance with various processes, which may be applied separately or cumulatively. Under a first process, the data processor 159 or the atmospheric modeling module is configured to generate atmospheric-related aiding information in rover receiver 12 based on the measurements received from base receiver. Under a second process, if no correction data are received from the augmentation system, atmospheric related aiding data in step S252 can be generated without any corrections.

Under a third process, the data processor 159 or atmospheric modeling module 405 is configured to use an adaptive error model for atmospheric error residual estimation from step S256 without the preset error model stage. For example, only an adaptive error model component is applied, instead of both error models of the dual error model.

Under a fourth process, raw base measurements and base coordinate instead of range errors are sent to rover along with aiding information in step S252. Under a fifth process, the base station receiver, the rover receiver or both may provide tropospheric delay data, such as zenith (tropospheric) delay, or slant (tropospheric) delay, or both for each carrier phase measurement of a satellite signal between the base station receiver or the rover receiver and a respective satellite. Under a sixth process, the base station receiver, the rover receiver or both may provide ionospheric delay data, such as zenith (ionospheric) delay, or slant (ionospheric) delay, or both for each carrier phase measurement of a satellite signal between the base station receiver or the rover receiver and a respective satellite.

Under a seventh process, the electronic data processor 159, the atmospheric modeling module 405, and/or dual error model comprises a tropospheric delay estimation that applies the mapping function of rover receiver and rover troposphere zenith delay in accordance with the following equation:

$$\Delta d_{trop} = M_R d_{tropR}^Z$$

where $\Delta d_{trop}$ is a change in tropospheric delay, $M_R$ is the rover mapping function, and $d_{tropR}^Z$ is the rover tropospheric delay in the Zenith direction above the rover receiver.

Under an eighth process, the electronic data processor 159, the atmospheric modeling module 405, and/or dual error model comprises the prefixed error model for ionospheric delay that is configured to depend on the distance or baseline distance between the base station receiver and the rover receiver and the elevation angle of each code phase or carrier phase measurement.

Under a ninth process, the electronic data processor 159, the atmospheric modeling module 405, and/or dual error model comprises the adaptive error model, such as a system, method or software instructions storable in the data storage device 155, to predict ionospheric activity level for each measurement epoch by epoch. For example, the method, system or software instructions to predict ionosphere activity level is based on the time-differenced Geometry-Free (TDGF) for each satellite in accordance with the following equation:

$$\Delta L_{ij} = (L_{ij}^t - L_{ij}^k)/(t-k) = \frac{\Delta \dot{d}_{ion}}{f_i^2} - \frac{d_{ion}}{f_j^2} + \Delta \sigma_{ij}$$

where the carrier phase measurements for frequency i and j at time t and at time k are differenced, and where the dot above the $\Delta \dot{d}_{ion}$ indicates a time derivative or a change rate in ionospheric delay between time t and k, which in practice may be negligible.

Under a tenth process, the data processor 159 or the atmospheric modeling module 405 comprises an adaptive error model, such as a method, system or software instructions storage in the data storage device 155, to predict ionospheric activity level based on the averaged, time-differenced Geometry-Free (TDGF) over the carrier phase measurements in accordance with the following equation:

$$\overline{\Delta L_{i,j}} = \left(\sum_n \Delta L_{ij}\right)/n$$

where $\overline{\Delta L_{ij}}$ is the time-averaged (TA), time-differenced geometry-free (TDGF) carrier phase measurements at frequencies i and j (or frequency indexes i and j) for carrier phase measurements 1 through n, where n is positive integer value greater than 1.

Under an eleventh process, the adaptive error model includes a method, system or software instructions storage in the data storage device 155, to predict ionosphere activity level is based on the weighted averaged time-differenced Geometry-Free (TDGF) over the carrier phase measurements in accordance with the following equations:

$$\widetilde{\Delta L}_{i,j} = \left(\sum_n w_n \times \Delta L_{ij}\right)/n$$

where $\widetilde{\Delta L}_{ij}$ is the time-averaged (TA), time-differenced geometry-free (TDGF) carrier phase measurements at frequencies i and j (or frequency indexes i and j) for carrier phase measurements 1 through n, where n is positive integer value greater than 1. weighted-average by weights $w_n$ for the carrier phase measurements 1 through n.

Under a twelfth process, the data processor 159 or the atmospheric modeling module 405 determines or calculates time-differenced Geometry-Free (TDGF) carrier phase measurements is based on the atmospheric (e.g., ionospheric) corrected measurements, or based on base measurements and rover measurements, respectively.

Under a thirteenth process, the data processor 159 or the atmospheric modeling module 405 is configured to predict ionospheric activity level is based on a value derived by converting the respective time-differenced Geometry-Free (TDGF) to a specific measurement frequency.

In step S258, the rover receiver 12 is configured to conduct ambiguity resolution to fix or resolve carrier phase ambiguities for qualified, eligible or candidate ambiguities that were selected. The ambiguity fix or resolution may follow various techniques for quality control, qualification or eligibility of ambiguity candidates. Under a first technique, the ambiguity resolution module 407 or data processor 159 comprises a quality control technique to minimize wrong fixes or resolutions of ambiguities for carrier phase of one or more carrier signals or channels. Under a second technique, the ambiguity resolution module 407 or the data processor 159 is configured to evaluate or determine the qualification or (verify) eligibility of an ambiguity candidate for an ambiguity search and fix process based on the value of time-differenced Geometry-Free (TDGF) for that measurement. Under a third technique, the ambiguity resolution module 407 or the data processor 159 is configured to evaluate or determine the qualification or (verify) eligibility of an ambiguity candidate for an ambiguity search and fix process based on the baseline length dependent cut off angle and the elevation of each measurement. Under a fourth technique, the ambiguity resolution module 407 is configured to evaluate or determine qualification or (verify) eligibility of an ambiguity candidate for an ambiguity search and fix process based on time-differenced Geometry-Free (TDGF) testing, augmented baseline testing, or both.

In step S260, the above steps S250 through S258, inclusive, can be repeated until a sufficient number of ambiguities are fixed or resolved for satellite channels or satellite signals, where the sufficient number may be based on: (a) fixed or resolved ambiguities for carrier phase signals or channels of at least four satellites and/or (b) a greater set of available satellites (e.g., than a minimum of four satellites) within view or reliable reception range. For example, the above steps are iteratively repeated until the carrier phase ambiguities are resolved for a threshold number of satellite signals, satellite channels or satellites to provide a reliable position estimate.

FIG. 6 demonstrates a detailed example of a flow chart of step S205, the dual (e.g., two stage) ionospheric dynamic model. Like reference numbers in any two drawings indicate like steps, processes, features or elements.

In step S203, the RTK engine, data processor 159 or GNSS rover receiver 12 corrects or reduces errors in code phase measurements and/or carrier phase measurements based on the obtained correction data. Here, after step S203, step S205 comprises the logic of steps S301, alone or together with step S302 or S303.

In step S301, the RTK engine, data processor 159 or GNSS rover receives the corrected code phase and carrier phase measurements and checks the ambiguity status to determine whether the ambiguities for the carrier phase are fixed or resolved. If the ambiguities are fixed or resolved for the carrier phase measurements associated with a satellite channel of a particular satellite, the method continues with step S303. However, if the ambiguities are not fixed or resolved for the carrier phase measurements associated with the satellite channel of the particular satellite, the method continues with step S302.

In step S302, the RTK engine, data processor 159 or GNSS receiver is configured to select the preset ionosphere dynamic model. For example, in step S302 the preset ionosphere model will be applied before ambiguities are fixed.

In contrast, in step S303, the RTK engine, data processor 159 or GNSS receiver is configured to select an adaptive ionosphere model after the ambiguities are fixed or resolved (e.g., for a given satellite channel or signal).

In step S206, for each channel of any satellite, a GNSS receiver, data processor 159 or its filter is configured to filter a selected ionosphere model for ionospheric delay estimation. For example, the filter may comprise a Kalman filter, an extended Kalman filter, or another predictive filter for estimating ionospheric delay based on input parameters referenced in the equations of this disclosure.

Step S301 may be carried out in accordance with various techniques, which may be applied separately or cumulatively.

Under a first technique, the RTK engine, data processor 159 or GNSS receiver is configured to select an adaptive ionosphere model after the ambiguities are fixed or resolved (e.g., for a given satellite channel or signal). It is understood that the above selection is done on channel by channel basis (e.g., L1, L2, L5) for each satellite received by the GNSS receiver, such that, in practice, a mixture or hybrid of ionospheric models are used in the aggregate for any satellite or constellation of satellites.

Under a second technique, the RTK engine, data processor 159 or GNSS receiver is configured to select step S303 and the adaptive ionospheric error dynamic model if the ambiguity fixed determination determines that all ambiguities are fixed for a set of channels (e.g., all channels) of the respective satellite.

Under a third technique, the RTK engine, data processor 159 or GNSS receiver is configured to select the adaptive ionospheric error dynamic model of step S303 if the ambiguity fixed determination only determines that part of the ambiguities for the channels of a given satellite are fixed or resolved.

Under a fourth technique, the RTK engine, data processor 159 or GNSS receiver is configured a mixed dynamic model will be applied as adaptive error model will be applied to those measurements with fixed ambiguity and preset error model will be employed by the measurements without ambiguity fixing.

In step S303, the adaptive ionosphere dynamic model can be based on the time-differenced Geometry-Free (GF) (hereinafter "TDGF") combination of carrier phase measurements. In one embodiment, the ionospheric dynamic noise for each carrier phase measurement (or differenced phase measurement) is based on its own TDGF. In another embodiment, the ionosphere dynamic noise for each carrier phase measurement (or differenced carrier phase measurement) is based on a value derived by mapping its own TDGF into a specific frequency of the satellite signal or frequency index of multiple satellite signals. In another embodiment, TDGF can be averaged as in equation (8) to get a mean or time-averaged TDGF $\overline{\Delta L_{ij}}$. Further, all the measurements set up their dynamic noise based on $\overline{\Delta L_{ij}}$ for that measurement epoch, which is measurement time interval of the GNSS receiver or system in accordance with the following equation:

$$\overline{\Delta L_{ij}} = \left(\sum_n \Delta L_{ij}\right)/n \qquad (8)$$

where $\overline{\Delta L_{ij}}$ is the time-averaged (TA), time-differenced geometry-free (TDGF) carrier phase measurements at frequencies i and j (or frequency indexes i and j) for carrier phase measurements 1 through n, where n is positive integer value greater than 1.

In another embodiment, TDGF can be weighted-average by weights $w_n$ from 1 to n, such as in Equation (9), to get an averaged TDGF $\widetilde{\Delta L_{ij}}$, and the ionosphere dynamic noise for all satellites is based on $\widetilde{\Delta L_{ij}}$ for that measurement epoch in accordance with the following equation:

$$\widetilde{\Delta L_{ij}} = \left(\sum_n w_n \times \Delta L_{ij}\right)/n \qquad (9)$$

In step S302, the preset ionosphere dynamic noise model is based on baseline length and elevation angle for each carrier phase measurement (or differenced carrier phase measurements).

FIG. 7 is one embodiment of a representative flowchart of a method for reliable ambiguity resolution. The method of reliable ambiguity resolution begins with step S206. Like reference numbers in any two drawings, such as FIG. 1A through FIG. 7, inclusive, indicate like steps, methods, processes, elements or features.

In step S206, for each channel of any satellite, a GNSS receiver, data processor 159 or its filter is configured to filter a selected ionosphere model for ionospheric delay estimation. For example, the filter may comprise a Kalman filter, an extended Kalman filter, or another predictive filter for estimating ionospheric delay based on input parameters referenced in the equations of this disclosure.

In FIG. 7, step S207 can be subdivided into a series of sub-steps or steps S401, S402 and S403, which collectively comprise step S207. In step S401, the GNSS receiver, data processor 159 or its ambiguity resolution module requests float ambiguities and variance co-variance information from the positioning filter.

In step S402, the GNSS receiver, data processor 159 or its ambiguity resolution module checks the status of each ambiguity and selects the eligible ambiguities or candidate ambiguities. The eligibility check for the ambiguity resolution process may be handled by various techniques, which may be applied separately or cumulatively. Under a first technique, in step S402 the GNSS receiver, data processor 159 or its ambiguity resolution module is configured to select all available ambiguities as eligible ambiguities or candidate ambiguities for the search process of step S403. Under a second technique (for step S402), the GNSS receiver, data processor 159 or its ambiguity resolution module is configured to determine the eligibility of each ambiguity based on TDGF of the corresponding carrier phase measurement(s). For example, carrier phase measurements with large TDGF can be excluded as eligible ambiguities or candidate ambiguities for ambiguity resolution. The evaluation of TDGF to check eligibility of ambiguities and to select eligible or candidate ambiguities may be referred to as TDGF testing.

Under a third technique (for step S402), the GNSS receiver, data processor 159 or its ambiguity resolution module is configured to determine eligibility of each ambiguity based on baseline-length-dependent-cut-off angle (e.g., critical angle) and the elevation of each satellite; therefore, an ambiguity is excluded for ambiguity resolution if that satellite is lower than the critical angle or cut-off angle determined by the baseline length at that measurement epoch. The technique of evaluation of each ambiguity is determined based on baseline-length-dependent-cut-off angle (e.g., critical angle) and the elevation of each satellite may be described as augmented baseline testing. Under a fourth technique, the GNSS receiver, data processor 159 or its ambiguity resolution module is configured to determine eligibility of each ambiguity by both TDGF testing and augmented baseline testing, which can be referred to as mixed testing or hybrid testing.

In step S403, the GNSS receiver, data processor 159 or its filter performs an integer ambiguity search and fix is performed among the eligible ambiguities or candidate ambiguities. For example, if a candidate ambiguity satisfies a search criteria or error minimization process, the candidate ambiguity is selected as the fixed or resolved ambiguity for the carrier phase measurement of a corresponding satellite signal or channel between the GNSS receiver and a respective satellite. The process of step S207 and its constituent steps S401, S402 and S403 are repeated or iterated for each satellite signal or satellite channel received at the GNSS receiver until the ambiguities are resolved or fixed for at least four satellites, or a set of satellites within reliable reception range or view of the GNSS receiver.

This disclosure system and method that can expand the RTK working range and make it invulnerable to ionosphere activities with the aid of augmentation systems. The following description is intended to cover all alternatives, modifications and equivalents that are included in the spirit and scope of the invention, as defined in the appended claims The system and method is well suited to improve the performance of Real Time Kinematic GNSS with long base and rover distances or with strong ionosphere activity levels. Although certain embodiments of receivers, systems, methods, processes and examples have been described in this disclosure, the scope of the coverage of this disclosure may extend to variants of the receiver, systems, methods, processes and examples and systems and concepts disclosed herein. For example, in any patent that may be granted on this disclosure, one or more claims can cover equivalents and variants to the full extent permitted under applicable law, among other things.

What is claimed is:

1. A method for a estimating position by a rover receiver in wireless communication with a base station receiver at a known location, the rover receiver and the base station receiver capable of receiving a plurality of Global Navigation Satellite System (GNSS) signals from GNSS satellites, the method comprising:
   obtaining initial code pseudo-range measurements and initial carrier phase measurements from the signals transmitted by GNSS satellites;
   receiving, by a wireless communications device associated with to the rover receiver and the base station receiver, satellite orbit and clock corrections from an augmentation system;
   generating measurement range errors and atmospheric related aiding data based on the known location of the base station receiver, with the aid of satellite orbit and clock corrections from the augmentation system;
   sending, via a wireless link, the range errors and aiding information to the rover receiver;
   using the range errors and the aiding information from base station receiver to correct the initial code pseudo-range measurements and the initial carrier phase measurements to mitigate errors in the signal, to result in corrected code pseudo-range measurements and corrected carrier phase measurements;
   estimating the residual of atmosphere delay with dual error model that is configured to apply a preset error model before ambiguities are fixed or resolved, and to apply adaptive error model after ambiguities are fixed or resolved; and
   conducting ambiguity resolution to fix carrier phase ambiguities for qualified or eligible ambiguities.

2. The method of claim 1 wherein the steps of claim 1 are iteratively repeated until the carrier phase ambiguities are resolved for a threshold number of satellite signals, satellite channels or satellites to provide a reliable position estimate.

3. The method of claim 1 wherein the base station receiver operates in a precise point positioning (PPP) mode with the aid of augmentation system or single point Real-Time-Kinematic (RTK) positioning mode without the aid of augmentation system to generate atmospheric-related aiding information.

4. The method of claim 3 wherein the atmospheric related aiding information from base station receiver includes any of the following: tropospheric delay data, ionospheric delay data, and ambiguity resolution aiding data for carrier phase ambiguities resolution or fixing.

5. The method of claim 4 wherein the tropospheric delay data includes either zenith delay or slant delay for each carrier phase measurement of a satellite signal between the base station receiver or the rover receiver and a respective satellite.

6. The method of claim 4 wherein the ionospheric delay data includes either zenith delay or slant delay for each measurement.

7. The method of claim 1 wherein the range errors associated with real-time-kinematic (RTK) processing and troposphere related aiding information are generated at rover receiver based on the received raw measurements from base station receiver, the augmentation information and the known location in two or three dimensional coordinates.

8. The method of claim 1 wherein correcting pseudo-range or code phase measurements and carrier phase measurements includes applying range errors and slant atmospheric delay of base station receiver to adjust or correct code phase measurements and carrier phase measurements of the rover receiver.

9. The method of claim 8 wherein the slant atmospheric delay is obtained from the estimated slant delay of the base station receiver for each code phase or carrier phase measurement in the aiding information.

10. The method of claim 8 wherein the slant atmospheric delay is obtained by multiplying base zenith atmospheric delay received from aiding information and the mapping function of each carrier phase and code phase measurement.

11. The method of claim 1 wherein the dual error model comprises a tropospheric delay estimation that applies the mapping function of rover receiver and rover troposphere zenith delay in accordance with the following equation:

$$\Delta d_{trop} = M_R d_{tropR}^{\ Z}$$

where $\Delta d_{trop}$ is a change in tropospheric delay, $M_R$ is the rover mapping function, and $d_{tropR}^{\ Z}$ is the rover tropospheric delay in the Zenith direction above the rover receiver.

12. The method of claim 1 wherein the dual error model comprises the prefixed error model for ionospheric delay that is configured to depend on the distance or baseline distance between the base station receiver and the rover receiver and the elevation angle of each code phase or carrier phase measurement.

13. The method of claim 1 wherein the adaptive error model includes a method to predict ionospheric activity level for each measurement epoch by epoch.

14. The method of claim 13 wherein the method to predict ionosphere activity level is based on the time-differenced Geometry-Free (TDGF) for each satellite in accordance with the following equation:

$$\Delta L_{ij} = \left(L_{ij}^t - L_{ij}^k\right)/(t-k) \frac{\Delta \dot{d}_{ion}}{f_i^2} - \frac{\Delta \dot{d}_{ion}}{f_j^2} + \Delta \sigma_{ij}$$

where the carrier phase measurements for frequency i and j at time t, $L_{ij}^t$, and carrier phase measurements for frequency i and j at time k, $L_{ij}^k$, are differenced, and where the dot above the $\Delta \dot{d}_{ion}$ indicates a time derivative or a change rate in ionospheric error term between time t and k; where the dot above $\dot{d}_{ion}$ indicates a time derivative or change in ionospheric delay between time t and k; $f_i$ is measurement frequency i; $f_j$ is measurement frequency j; where $\Delta \sigma_{ij}$ is the change in measurement error for frequencies i and j at between t and at time k.

15. The method of claim 13 wherein the method to predict ionosphere activity level is based on the averaged, time-differenced Geometry-Free (TDGF) over the carrier phase measurements in accordance with the following equation:

$$\overline{\Delta L_{ij}} = \left(\sum_n \Delta L_{ij}\right)/n$$

where $\overline{\Delta L_{ij}}$ is the time-averaged (TA), time-differenced geometry-free (TDGF) carrier phase measurements at frequencies i and j (or frequency indexes i and j) for carrier phase measurements 1 through n, where n is positive integer value greater than 1.

16. The method of claim 13 wherein the method to predict ionosphere activity level is based on the weighted averaged time-differenced Geometry-Free (TDGF) over the carrier phase measurements in accordance with the following equations:

$$\widetilde{\Delta L_{ij}} = \left(\sum_n w_n \times \Delta L_{ij}\right)/n$$

where $\widetilde{\Delta L_{ij}}$ is the time-averaged (TA), time-differenced geometry-free (TDGF) carrier phase measurements at frequencies i and j (or frequency indexes i and j) for carrier phase measurements 1 through n, where n is positive integer value greater than 1, weighted-average by weights $w_n$ for the carrier phase measurements 1 through n.

17. The method of claim 13 wherein the calculation of TDGF is based on the corrected measurements or based on base measurements and rover measurements respectively.

18. The method of claim 13 wherein the value to predict ionospheric activity level is the value by converting the respective time-differenced Geometry-Free (TDGF) to a specific measurement frequency.

19. The method of claim 1 wherein only an adaptive error model component is applied, instead of both error models of the dual error model.

20. The method of claim 1 wherein the ambiguity resolution includes a quality control technique to minimize wrong fixes or resolutions of ambiguities for carrier phase of one or more carrier signals or channels.

21. The method of claim 20 wherein the qualification or eligibility of an ambiguity candidate for an ambiguity search and fix process is determined by the value of time-differenced Geometry-Free (TDGF) for that measurement.

22. The method of claim 20 wherein the qualification or eligibility of an ambiguity candidate for an ambiguity search and fix process is determined by the baseline length dependent cut off angle and the elevation of each measurement.

23. The method of claim 20 wherein the qualification or eligibility of an ambiguity candidate for an ambiguity search and fix process is determined by both time-differenced Geometry-Free (TDGF) testing, augmented baseline testing, or both.

24. The method of claim 1 wherein the base station receiver sends, via a wireless communications channel, raw phase measurements, raw code measurements and known location coordinates instead of range errors to the rover receiver along with aiding information.

* * * * *